US012798659B2

(12) United States Patent
Battlogg

(10) Patent No.: US 12,798,659 B2
(45) Date of Patent: Nov. 17, 2026

(54) STEERING DEVICE WITH A MAGNETORHEOLOGICAL BRAKING DEVICE AND METHOD FOR OPERATING A STEERING DEVICE

(71) Applicant: INVENTUS Engineering GmbH, St. Anton i.M. (AT)

(72) Inventor: Stefan Battlogg, St. Anton i.M. (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 423 days.

(21) Appl. No.: 18/256,962

(22) PCT Filed: Dec. 13, 2021

(86) PCT No.: PCT/EP2021/085570

§ 371 (c)(1),
(2) Date: Jun. 12, 2023

(87) PCT Pub. No.: WO2022/123090

PCT Pub. Date: Jun. 16, 2022

(65) Prior Publication Data

US 2024/0101184 A1 Mar. 28, 2024

(30) Foreign Application Priority Data

Dec. 12, 2020 (DE) ..................... 10 2020 133 246.7
Oct. 12, 2021 (DE) ..................... 10 2021 126 371.9
Oct. 12, 2021 (DE) ..................... 10 2021 126 379.4

(51) Int. Cl.
*B62D 5/00* (2006.01)
*F16D 57/00* (2006.01)

(52) U.S. Cl.
CPC .......... *B62D 5/006* (2013.01); *F16D 57/002* (2013.01)

(58) Field of Classification Search
None
See application file for complete search history.

(56) References Cited

U.S. PATENT DOCUMENTS 4,346,151 A * 8/1982 Uba .................... H01M 50/325 429/94
10,927,919 B2 2/2021 Battlogg
(Continued)

FOREIGN PATENT DOCUMENTS

CN 108368910 A 8/2018
CN 110869885 A 3/2020
(Continued)

OTHER PUBLICATIONS

A review on the magnetorheological fluid preparation and stabilization in Journal of Magnetism and Magnetic Materials 374 (2015) 716-730 (Year: 2015).*

*Primary Examiner* — Adam D Tissot
*Assistant Examiner* — Laura E Linhardt
(74) *Attorney, Agent, or Firm* — Laurence A. Greenberg; Werner H. Stemer; Ralph E. Locher

(57) ABSTRACT

A steering device with a movable steering unit. A movement of the steering unit can be braked by a magnetorheological braking device. The braking device has a stationary holder and two brake components. One brake component can be rotated by the steering unit. One brake component is connected to the holder for conjoint rotation. The two brake components can continuously rotate relative to one another about an axis. A first brake component extends along the axis and has a magnetically conductive core. The second brake component has a casing part around the first brake component. A gap between the first and second brake component is filled with a magnetorheological medium. The gap has two brake gap portions. A disk contour is formed between the casing part and core in a first brake gap portion, and a
(Continued)

different disk contour is formed between the casing part and core in a second brake gap portion.

39 Claims, 5 Drawing Sheets

(56) References Cited

U.S. PATENT DOCUMENTS

| | | | | |
|---|---|---|---|---|
| 10,976,827 | B2 | 4/2021 | Battlogg | |
| 11,231,780 | B2 | 1/2022 | Battlogg | |
| 11,295,632 | B2 | 4/2022 | Greiner | |
| 2002/0057152 | A1 | 5/2002 | Elferich et al. | |
| 2002/0108804 | A1 * | 8/2002 | Park | B62D 5/005 180/444 |
| 2006/0197741 | A1 | 9/2006 | Biggadike | |
| 2006/0280575 | A1 | 12/2006 | Ruettiger | |
| 2013/0175132 | A1 * | 7/2013 | Battlogg | F16C 33/6688 192/21.5 |
| 2014/0051020 | A1 * | 2/2014 | Harada | C09C 1/24 428/402 |
| 2016/0153508 | A1 * | 6/2016 | Battlogg | A61F 2/38 188/267.2 |
| 2016/0378131 | A1 * | 12/2016 | Battlogg | F16H 59/0217 74/553 |
| 2018/0156285 | A1 | 6/2018 | Plante et al. | |
| 2020/0174512 | A1 | 6/2020 | Battlogg | |
| 2020/0257369 | A1 | 8/2020 | Battlogg | |
| 2020/0332846 | A1 * | 10/2020 | Koike | G05G 1/10 |
| 2020/0355229 | A1 | 11/2020 | Battlogg | |
| 2023/0271508 | A1 * | 8/2023 | Healy | B60L 7/18 180/2.2 |

FOREIGN PATENT DOCUMENTS

| | | | |
|---|---|---|---|
| DE | 10029191 | A1 | 12/2001 |
| DE | 10221241 | A1 | 11/2003 |
| DE | 102004041690 | A1 | 3/2005 |
| DE | 102004009906 | B3 | 7/2005 |
| DE | 102010055831 | A1 | 6/2012 |
| DE | 102017111031 | A1 | 11/2018 |
| DE | 102018100390 | A1 | 7/2019 |
| DE | 102018222844 | B3 | 4/2020 |
| EP | 2603774 | B1 | 3/2015 |
| EP | 3118075 | A1 | 1/2017 |
| EP | 3299658 | B1 | 8/2019 |
| EP | 3317750 | B1 | 10/2019 |
| WO | 2012034697 | A1 | 3/2012 |
| WO | 2018215350 | A1 | 11/2018 |

* cited by examiner

STEERING DEVICE WITH A MAGNETORHEOLOGICAL BRAKING DEVICE AND METHOD FOR OPERATING A STEERING DEVICE

The invention relates to a steering device for controlling a vehicle by means of a movable steering unit and a method for operating a steering device. The steering device comprises a magnetorheological braking device with a stationary holder and with at least two braking components which can be rotated continuously relative to one another about an axis of rotation.

High demands are placed on such steering devices. For example, precise steering feedback and backlash-free or jerk-free steering behavior, especially around the center position, and overall very smooth, harmonious steering behavior are required. In addition, the braking device must be able to provide high braking torques, for example for hard end stops when the steering wheel is turning rapidly (i.e., high kinetic energy if the steering wheel is turned quickly when maneuvering, for example at 1000°/s). Due to the sharp increase in the number of controls in the steering wheel, the steering wheels are becoming heavier, which increases kinetic energy. High braking torques are also required when the driver (or user) holds or supports himself/herself on the steering wheel when getting out or in (aid for getting in and out). Such braking torques can be, for example, 25 Newton meters, 35 Newton meters or more.

At the same time, the braking device must also be able to provide very low braking torques (less than 1 newton meter, preferably less than 0.5 newton meters), for example if only very slight steering movements are made to keep in lane when driving straight ahead. Likewise, low braking torques are required for steering movements around the central position or when changing direction (e.g., 1 to 3 Newton meters) so that the vehicle can be guided softly and a winding stretch of road can be driven through quickly and harmoniously at the same time. Overall, sensitive and precise steering is only possible with very smooth steering. For example, braking torques of less than one Newton meter are desired.

Furthermore, it should be possible to adjust different braking torques without any noticeable transitions or steplessly and with high control quality. In addition, the braking torques should be adjustable with the shortest possible response times, for example in less than 100 ms. The installation space for the steering device is generally very limited, for example in a dashboard in modern vehicles with a heads-up display.

The aforementioned requirements are technologically very difficult to achieve. One problem is that high braking torques usually require corresponding friction diameters and sizes, which in turn disadvantageously increases the basic torque (also referred to as idling torque). However, a high basic torque is contrary to the requirement for easy steering.

For example, friction clutches are known which offer a high maximum braking torque. However, when there is no current, the friction surfaces required to achieve the braking torque cause unfavorably high basic friction, for example one newton meter of basic friction at a maximum braking torque of 20 newton meters.

Furthermore, steering systems with an electric motor have become known, which is coupled to the steering wheel either directly or via a reduction gear or (toothed) belt. Such directly attached electric motors generate, for example, active braking torques (nominal torques) of up to eight newton meters and briefly passive braking torques of up to 25 newton meters. Because of the correspondingly high braking torque, however, such electric motors are large and heavy as well as sluggish (mass moment of inertia) and often expensive. Due to the large working range, the controllability at low braking torques is in need of improvement.

For example, electric motors that are translated via belt drives and mounted parallel to the steering train (indirect arrangement) should be designed more advantageously, since the additional belt drive, belt wheels, brackets require space and cause flexibility, play and additional costs.

Since electric motors in the steering system have to generate the high braking torque primarily at low speeds, the electricity requirement or power requirement is also disadvantageously high. At the same time, electric motors have a very unfavorable level of efficiency at low speeds or when stationary (e.g., to provide an end stop) and therefore often heat up very quickly. This in turn degrades the efficiency as the coil resistance increases. As a result, the engine heats up even faster and everything rocks and the power requirement increases quickly and very sharply.

A steer-by-wire steering system for a motor vehicle with an electric motor and a magnetorheological brake is known from DE 10 221 241 A1.

Magnetorheological brakes with magnetorheological fluids are known from the prior art, e.g., the MRF brake from Lord Corporation in various sizes (5 Nm, 12 Nm, 20 Nm): https://www.lord.com/products-and-solutions/steer-by-wire-tactile-feedback-device. These are also used as "steer-by-wire tactile feedback", among other things. These brakes work on their own. A disadvantage of these MRF brakes, however, is their relatively high basic friction (basic torque) in relation to the maximum torque (working range). The working range of the 5 Nm brake According to Lord's website/specification, it is 0.5 to 5 Nm (factor 10), with the 12 Nm brake the working range is between 1 Nm and 12 Nm (factor 12) and with the 20 Nm brake the working range is between 1 Nm and 20 Nm (factor 20) This relatively small working range is for many Applications are not sufficient, which is why these series products are primarily used for coarse motor applications (among other things, operation mostly with gloves, as in industry, on agricultural machines, on forklifts . . . ).

For (predominantly) fine-motor applications such as steering a passenger car, a significantly lower basic torque with a simultaneously higher maximum torque is advantageous, i.e., a significantly larger working range. The high basic torque in particular quickly leads to fatigue when steering, for example, or does not feel comfortable. However, the well-known MRF brakes do not allow a large working range because the friction surfaces are too large. Although smaller friction surfaces would reduce the basic torque, this would also reduce the maximum torque, which would be unfavorable for steering systems in particular.

SUMMARY OF THE INVENTION

In contrast, it is the object of the present invention to provide an improved steering device. In particular, the steering device should meet the requirements discussed above as far as possible and preferably at the same time offer a reliable and safe function and be economical to produce.

This object is achieved by a steering device having the features of the device claims. The method according to the invention is the subject of the method claims. Preferred developments of the invention are the subject of the dependent claims. Further advantages and features of the present invention result from the general description and from the description of the exemplary embodiments.

The steering device according to the invention serves to control (steer) a vehicle by means of a (at least partially manually) movable steering unit. A movement of the steering unit can be braked (in particular damped) by means of at least one magnetorheological braking device. The braking device includes a stationary holder and at least two braking components. At least one of the at least two brake components is rotatable by the steering unit. In particular, the braking component is rotatably coupled to the steering unit. At least one other of the at least two brake components is rotationally connected to the bracket. The two brake components are continuously rotatable relative to each other about an axis of rotation. A first braking component extends along the axis of rotation. This means that the first braking component extends at least in sections along the axis of rotation. Or that at least a portion of the first braking component, or preferably a substantial part of the first braking component, extends along the axis of rotation. The first braking component includes a core made of a magnetically conductive material. The second brake component comprises a shell part which extends around the first brake component (in particular in the radial and/or axial direction) and is of hollow design. At least one circumferential gap, that is at least partially filled with a magnetorheological medium, is formed between the first and the second brake component. In this case, the gap comprises at least three brake gap sections (in particular spaced apart axially from one another and preferably circumferential). The brake gap sections can be designed the same or different. In particular, the brake gap sections can be designed the same or different with respect to their disk contours. Alternatively, or additionally, the gap comprises at least two different braking gap sections. The brake gap sections are in particular formed radially. Additionally, or alternatively, the brake gap sections can also be formed axially. In this case, a disc contour is formed between the casing part and the core in or on a first braking gap section. On or in a second brake gap section, a disc contour of different shape (that is to say from the first brake gap section) is formed between the casing part and the core.

The steering device according to the invention offers many advantages. A significant advantage is that e.g., two separate electrical coils (with brake gap sections that interact with it) are provided and can be controlled differently. As a result, the steering can be set even better and more sensitively and, if necessary, with very high torques. The braking effect can thus be set, for example, at low speeds or at a standstill with one or the first electrical coil (and the associated braking gap), while the braking torque can be optimally set, for example at higher speeds, with the second electrical coil (plus braking gap). The respective current intensities and current curves can be set independently of one another.

Especially when the available electronics do not have a large control range, it is advantageous if two (same or sometimes different) coils for different torques and speeds can be controlled independently of each other. This is the case, for example, in passenger cars, where the on-board electronics only provide limited power or voltage. A first electrical coil (e.g., with a star contour in the braking gap section) can be used there for the low braking torques, in which small torques (e.g., 0.1 Nm) are to be generated with high resolution. In this case, the controllable torque is also not (or only minimally) dependent on the speed. The second electrical coil can be, for example, the magnetic field in another and, for example, the second or third brake gap section for high locking torques or the maximum torque or regulate, for example, for an exit assistance. Such high moments usually do not require a high resolution and the speed dependency is not decisive in this case.

The invention makes it possible, for example, for braking at a standstill (blocking) to use an electrical coil or a magnetic circuit (designed especially for this purpose), with which a particularly high braking torque can be generated. In doing so (in Standstill at high torques) the reproducibility is often not particularly accurate, which reduces the design effort and costs. A stationary brake component does not turn as long as the braking torque is high enough and not exceeded. The other electrical coil or the other magnetic circuit can then be designed, for example, to brake the corresponding braking component in a targeted manner during operation when rotating. This regularly requires a higher level of reproducibility, so that no difference or only a small difference can be felt haptically. This usually requires higher demands on the structural conditions and can require greater technical effort and higher costs. The invention makes both properties possible in a simple manner and overall a cost-effective design.

At least one third brake gap section is preferably arranged axially between a first brake gap section and a second brake gap section. In particular, at least one first electric coil is assigned to the first brake gap section and at least one separately controllable second electric coil is assigned to the second brake gap section.

The two disc contours of the at least two brake gap sections, which are specifically shaped differently, also offer a considerable advantage. So, for example, with the first brake gap section low and at the same time particularly precisely controllable braking torques are generated. With the second brake gap section, for example, particularly high braking torques, for example for end stops or the entry/exit help is generated. A particular advantage is that both braking sections have a particularly low basic torque. A further advantage is that such a braking device requires little installation space overall and can be implemented in a structurally uncomplicated manner and can be manufactured economically. In addition, the steering device according to the invention is particularly reliable because the brake gap sections allow redundancy.

The first and the second brake gap sections are preferably designed differently in the radial (and/or axial) direction and/or are designed differently in terms of function. Preferably, the first braking gap section and the second braking gap section are formed with different widths (gap height) and/or have different cross-sectional profiles.

The second braking gap section preferably has a variable gap height over the circumference of the braking gap section. In particular, the second braking gap section has a disc contour designed as a star contour. The first braking gap section preferably has a constant gap height over the circumference of the braking gap section. In particular, the first brake gap section has a disc contour with a cylindrical outer geometry. It is also possible and preferred that the first braking gap section has a gap height that varies less greatly over the circumference of the braking gap section than the second braking gap section. The first braking gap section then also has, in particular, a star contour.

In an advantageous and preferred embodiment, the steering device comprises at least one drive device for generating a drive torque for the active movement of the steering unit. In particular, the drive device comprises at least one electric motor. The electric motor is arranged at least for the most part radially (and preferably also axially) within an outer circumference defined by the gap (in particular by the braking gap sections of the braking device). In particular, at least one rotor and/or stator of one electric motor is arranged within such an outer circumference. With respect to its outer circumference, the gap surrounds the electric motor in particular radially and preferably also axially.

The steering device can be used in motor vehicles (e.g., passenger cars; ON-Highway vehicles), aircraft, airplanes, ships, boats, in agricultural engineering, for example in tractors or combine harvesters, harvesters and other field machines for agriculture (OFF-Highway Vehicles). It can also be used in construction machinery and, for example, forklifts or similar machines or in simulators for simulating vehicle control (gaming; sim race; computer peripherals . . . ). The steering device can also be used in particular for vehicles that are at least partially autonomous.

The steering unit can, for example, be used as a steering wheel, handlebar or handlebar, joystick, control horn, control pedal, control lever or be designed as a joystick or as a control wheel. Other types of moveable steering units for steering vehicles are also possible. The movement of the steering unit is in particular a rotary movement. In particular, the steering unit can be moved in at least two directions of rotation. The movement of the steering unit can also be another type of movement. The steering device can include at least one transmission device which is suitable and designed to convert the movement of the steering unit into a rotational movement of one of the components of the braking device.

In all of the configurations, it is preferred that the braking torque is adjustable in real time.

In particular, the steering device comprises at least one actuator device for converting a steering movement carried out with the steering unit into a vehicle movement. In particular, the steering unit and the actuator device are functionally connected only electrically and/or only electromagnetically. In particular, the steering unit and the actuator device (in normal operation) are not mechanically coupled. A mechanical coupling can be provided in emergency operation. In particular, the steering device is a steer-by-wire steering system. This also includes steer-by-wire steering, which in special situations, such as an emergency or a fail-safe situation, the steering train engage, so in particular there is a mechanical coupling between the steering unit or driver and wheel. In such an embodiment, the invention offers a particularly large number of advantages.

However, it is also possible for the steering device to be designed as a mechanical steering system and preferably as a power steering system. The two different brake gap sections can also be used advantageously with such a steering system.

In the case of an active influencing of the magnetorheological medium, the braking device has in particular a braking torque. In the case of an inactive influencing of the magnetorheological medium, the braking device has in particular a basic torque. In this case, the basic torque is at least 50 times lower, preferably at least 90 times lower, and particularly preferably at least 100 times lower than a maximum braking torque that can be made available with the braking device. This offers a particularly large working area. This offers a particularly advantageous steering behavior and can be implemented particularly well with the braking device presented here. For the movement resistance of the steering unit, there is in particular a torque which is made up of at least the braking torque and the basic torque.

It is possible and advantageous for the braking device to have a basic torque of at most 0.5 Newton meters and preferably at most 0.25 Newton meters and particularly preferably at most 0.1 Newton meters when influencing the magnetorheological medium in an inactive manner.

In particular, a maximum braking torque of at least 25 Newton meters and preferably at least 45 Newton meters and particularly preferably at least 50 Newton meters can be generated with the braking device by actively influencing the magnetorheological medium.

In all configurations, it is preferred and advantageous that with one (in particular the second) brake gap section, a braking torque that is at least twice as high as with the other (in particular the first) brake gap section can be generated. In particular, a braking torque that is at least three times and preferably at least five times and particularly preferably at least ten times as high as with the other (especially the first) braking gap section can be generated with the one (especially the second) braking gap section.

In particular, only part and preferably less than half of the maximum braking torque can be generated with the first braking gap section. In particular, less than a quarter and preferably less than an eighth of the maximum braking torque can be generated with the first brake gap section. In particular, a braking torque can be generated with the first brake gap section, which is between zero Newton meters and ten Newton meters and preferably between zero Newton meters and eight Newton meters and particularly preferably between zero Newton meters and five Newton meters. Such braking torques can be adjusted with the first braking gap section with a particularly high control quality.

In particular, a major part and preferably at least two thirds of the maximum braking torque can be generated with the second brake gap section. In particular, at least three quarters or even at least 90% of the maximum braking torque can be generated with the second brake gap section. It is possible that the maximum braking torque can be generated solely with the second brake gap section. It is possible that at the same time as the second braking gap section, the first braking gap section is also activated for support. With such braking torques, the second brake gap section can be used particularly advantageously, since its properties in terms of controllability do not pose a disadvantage.

It is preferred and advantageous that a braking torque with the first brake gap section with a higher resolution than with the second brake gap section is adjustable. The first braking gap section preferably has a resolution that is at least ten times higher than that of the second braking gap section.

In particular, a braking torque with a resolution of at least 0.5 Newton meters and preferably at least 0.25 Newton meters and particularly preferably at least 0.15 Newton meters can be generated with the first brake gap section.

In all of the configurations, it is preferred and advantageous for a first electrical coil to be assigned to the first brake gap section and a second electrical coil to be assigned to the second brake gap section. In particular, the coils can be controlled separately. In particular, the coils serve to generate a (magnetic) field for influencing the magnetorheological medium. In particular, the coils can be controlled (in particular intelligently) by the steering control unit (described below). Such a configuration enables a particularly sensitive steering behavior and also offers reliable redundancy.

In the configurations described above, it is preferred and advantageous that the lower braking torques can be generated with one or only one part of the braking gap sections.

The higher braking torques can preferably be generated with at least two or with a larger part or even with all brake gap sections.

It is also possible for the at least two braking gap sections to be supplied by a common coil. Then, for example, at least one electrical coil wound around the axis of rotation and surrounding the core is provided between the casing part and the core.

In special/borderline cases or emergencies, the electric motor can be switched on and thus additionally increase the maximum braking torque. In particular, the steering device comprises at least one steering control unit for controlling the braking device. In particular, the braking torques of the at least two brake gap sections can be adjusted independently of one another with the steering control unit. In particular, the steering control unit serves to control the braking device depending on a position of the steering unit and/or depending on a movement parameter of the steering unit and/or depending on an operating state of the vehicle and/or depending on "data".

"Data" can be, for example: vehicle data such as speed, lateral acceleration, spatial position, braking values, GPS position, environment recognition, data/position of other vehicles (located in the vicinity of the vehicle), trailer yes/no, loading, passenger data (Height, weight, clothing, seating position, analysis data based on the evaluation of this data with e.g. artificial intelligence and suggestions; noises, gestures), external data (e.g. the driver's home sends data to the car; parking garage data in a parking garage . . . ).

A person's steering behavior in winter with a thick coat is different than in summer with thin clothing. The thick coat restricts the freedom of movement and therefore leads to a different steering behavior. If the control electronics recognize this based on "data", the behavior can be adjusted, e.g.: A quick tug on the steering to avoid it is more difficult with a thick and tight-fitting jacket (physically stiff) and in reality it is slower. This can be counteracted intelligently by increasing the ratio of the steering angle on the steering wheel to the steering angle on the wheel or wheels, so that the evasive maneuver is still quick. In addition, the necessary steering actuation force (assistance) can be reduced since the heavy casing acts as a damper.

If, based on the "data" and/or the near-field detection, it is recognized, for example, that the driver is tired and steering carelessly, this can be intelligently compensated. The driver can be warned (ripples or vibrations) or the steering unit implements the driver's command (turning the steering wheel) differently with the help of, for example, artificial intelligence, i.e., the movement of the steering wheel is not included 1:1 in the wheel adjustment. On a straight road (highway), this can prevent the vehicle from "snaking" and rocking.

On the other hand, such intelligent electronics can recognize fatigue based on data analysis (steering movements, face recognition, strange movement pattern of the driver, temperature, breathing noises . . . ) and intervene (warning; reduction of speed to a standstill; autonomous parking . . . ). This is particularly useful in the event of e.g., a dizzy spell, heart attack or similar.

The vehicle can also be prevented from being steered or moved if the data analysis recognizes that a child is behind the wheel (force, changing grip, near-field detection). If in doubt, the steering torque can be briefly increased in order to see whether the driver has enough strength when starting the vehicle, which is not the case with children.

The vehicle (machine learning/artificial intelligence/GPS data . . . ) knows, for example, that a pothole or a deep rut is about to occur, where the driver feels the vehicle restless or incorrectly due to this (body movement, pulling on the steering wheel . . . ). steers (track groove pulls too much to the edge . . . ). Here, the intelligent braking unit counteracts this and "calms down" this unnecessary or dynamically poor steering movement so that the destination is reached safely, comfortably and comfortably.

The same applies to snow, slippery surfaces, stones, etc. The steering adjusts itself to this and the active and passive moment is adjusted accordingly. In winter, if a vehicle slips when cornering (e.g., understeer) because of a slippery surface (snow, ice . . . ), the driver usually oversteers out of panic. As soon as the vehicle has grip again, it turns too much because of the steering, which leads to accidents. Here the steering torque should be increased or the driver should be given (haptic feedback, e.g., in the form of a ripple) that he oversteers.

The opposite is true when you drift (e.g., again in winter with snow and ice). Here the inexperienced driver usually steers too little and "loses" the vehicle, it skids. Here the steering can be made very easy, which promotes oversteering.

Some people like to keep the wheel all the way up (between 10 am and 2 am). This leads to more steering angle changes in the event of vibrations or the steering wheel is more difficult to keep still in this posture or it can also swing up (also referred to as motion sickness). If the interior monitor sees this steering wheel position, the torque can be increased a little in particular, which leads to smoother driving.

Small people also have a completely different steering wheel position than tall people and also different leverage distances due to the different lengths of their limbs. Shorter arms require more frequent gripping with larger steering wheel movements, which leads to unsteady steering maneuvers. If the change of grip or disadvantageous kinematic arm positions are detected ("data", near-field detection; analysis of the angle of rotation . . . ), the control unit or the artificial intelligence can "calm down" this process in particular, i.e., make it more harmonious.

This can also be an advantage if the driver has been on the road for a long time.

A haptic feedback when changing lanes can be performed. If 2 lanes are changed, there is a different feedback. Everything in combination with the "data" (e.g., navigation system, environment recognition . . . ). In particular, the steering provides appropriate feedback.

The invention is also advantageous in the following situations: parking spaces or parking areas in cities or multi-story car parks are expensive and should be used as best as possible. The parking spaces could be of different sizes and ideally assigned to the vehicle via data package (radio, WLAN, 5G . . . ) when driving into the parking garage. When parking, "the intelligent multi-story car park" should support the parking process, i.e., specify the ideal parking position and transmit it to the parked vehicle. The intelligent steering then carries out this or makes suggestions, which the driver then accepts and carries out or not (if e.g., there is an object in the parking space that was not recognized by the parking garage). The "intelligent parking garage" also knows and informs it here whether the neighboring vehicle had a passenger or not, i.e., your own vehicle can be parked closer to the passenger door. The user of the neighboring vehicle could also deposit and inform the "parking garage" that he is coming back with a passenger. If a vehicle is parked for a long time and this is communicated to the intelligent parking garage or parking space and the one parked next door is parked for a shorter time, it could even be parked close to the vehicle door, which in turn would save a lot of parking space. When buying tickets online, e.g. in airport car parks, you already know exactly how long you will be parked.

In advantageous embodiments, the parking process using the steering device and thus the distance to the next vehicle could also be adapted to the necessary door opening angle, so that the driver or the passengers can get in and out without problems. Based on the "data", the vehicle knows the opening angle or the body dimensions of the passengers. The intelligent parking garage can also record/recognize and intelligently distribute (use) these necessary distances.

If, based on the "data", the intelligent steering system notices that areas are being driven on that should not be driven on (e.g., pedestrian zones, cycle paths, blocking smiles, towards a building . . . ), so a haptic feedback can be output up to the intervention (counter-steering; standstill of the vehicle). However, a warning feedback is preferably always output first and the driver can also override this (it is therefore not patronized but usually only warned).

In particular, the position of the steering unit can be described (relatively or absolutely) by a rotation angle. In particular, the movement parameter includes at least one parameter from a group of parameters comprising: speed, angular velocity, torque, acceleration (negative and positive), duration. For example, targeted braking can take place if the steering movement is too rapid.

In particular, at least one sensor device for detecting these parameters is provided for controlling the braking device as a function of the aforementioned parameters. In particular, the steering control unit is operatively connected to at least one such sensor device. The position and/or the movement parameter can be detected by sensors on the steering unit and/or on the braking device. For example, the braking device includes at least one sensor device for detecting a position of the first component relative to the second component.

The operating state is defined in particular by at least one parameter from a group of parameters, comprising: vehicle speed, vehicle acceleration (negative and positive), wheel position, rudder position, steering angle, load status, user profile, temperature outside, temperature inside, weather conditions, time of year, traffic situation, road condition or Condition of the terrain, control variables of safety systems or assistance systems.

The steering control unit is preferably suitable and designed, depending on the level of a braking torque to be set at least one brake gap section of the at least to select two braking gap sections and at least thereby to brake the movement of the steering unit. In particular, the steering control unit takes into account the maximum braking torque that can be generated with the respective brake gap section. In particular, at least one value range of the adjustable braking torque is assigned to the at least two brake gap sections. Depending on the value range in which the braking torque to be set lies, the appropriate brake gap section can be selected.

It is also possible and advantageous that the steering control unit is suitable and designed to select at least two (or at least three or at least four) brake gap sections of the at least three brake gap sections depending on the level of a braking torque to be set and to generate the braking torque through their combination.

The steering control unit is preferably suitable and designed to generate a braking torque for braking the movement of the steering unit at least predominantly and preferably only with the first brake gap section when the vehicle speed is above a limit value (and the vehicle is operating normally). Such a limit value is, for example, 15 km/h or 25 km/h. At such or higher speeds, the braking torques must be set with a particularly high resolution in order not to negatively influence the steering behavior. Such a braking torque can be generated by a combination of at least two (or at least three or at least four) brake gap sections of the at least three brake gap sections.

The steering control device is particularly suitable and designed to block mobility of the steering unit and to generate the necessary braking torque predominantly and preferably only with the second brake gap section. In particular, the mobility of the steering unit can be blocked by means of the braking device. In particular, this allows a steering wheel lock to be provided. In particular, this can provide a support option on the steering unit. For example, the blocked steering unit can be used to hold on when getting out and/or getting in. Such a braking torque can be generated by a combination of at least two (or at least three or at least four) brake gap sections of the at least three brake gap sections.

In particular, the steering control device is suitable and designed to generate an end stop for the mobility of the steering unit at least predominantly and preferably only with the second brake gap section. Such an end stop is generated, for example, when the wheels or a rudder have reached the end of their intended path of movement. Such an end stop can be generated by a combination of at least two (or at least three or at least four) brake gap sections of the at least three brake gap sections.

For example, the steering means may comprise a steering wheel. Vehicles usually have various functions built into the steering wheel, e.g., buttons, knobs and wheels for operating on-board computers, etc., but also displays, steering wheel heating, etc., all of which require electricity and must receive and send signals. The electrical connection can be made, for example, via friction contacts, inductively, wirelessly or a coil spring.

It is advantageous and preferred that the steering control device is suitable and designed to brake or even block mobility of the steering unit depending on a driver assistance system. This can prevent critical steering movements. In particular, the steering control device selects at least one brake gap section of the at least two brake gap sections and controls it. For example, the first brake gap section is selected for sensitive braking and the second brake gap section is selected for blocking. For example, the steering control unit can do this at least two select and combine (or at least three or at least four) braking gap sections of the at least three braking gap sections.

A lane keeping system, for example, can be provided as a driving assistance system. Braking the steering unit can prevent you from leaving a lane or warn the driver (e.g., ripples). In addition, if the driver assistance system detects a critical driving situation and, for example, the vehicle swerving, a hectic steering movement and/or oversteering can be prevented by braking the steering unit in a targeted manner.

The driver assistance system can also include a parking aid. Then, by braking or blocking the steering unit, contact of the wheels with an obstacle (curb) can be prevented, for example. In particular, the steering control unit and/or the driver assistance system include at least one sensor device for detecting such situations (surround view; image recognition; radar, lidar . . . ). Such a sensor device can, for example, include an environment sensor and/or a GPS system.

It is possible for the steering control unit to be suitable and designed to take into account a user property for setting the braking torque. For example, the user characteristic can include a seating position, user height, user weight, user clothing and/or the user's ability to drive. The user property can be stored in a user profile and/or can be detected by sensors. For example, near-field detection and/or an internal camera (e.g. with image/face recognition) are provided for this purpose.

The steering control unit is particularly suitable and designed to set the braking torque as a function of the position at which the steering unit is held. So, an unfavorable holding of the steering unit by a higher braking torque can be compensated for, for example, so that no unwanted steering movements occur in the event of potholes.

In all of the configurations, it is preferred and advantageous that the steering control device is suitable and designed to generate feedback that is haptically perceptible on the steering unit. The feedback includes in particular a defined sequence of braking torques. For example, such feedback can be perceived as a vibration on the steering unit. Rattling and/or jerking (ripples) can also be perceived. It is possible that the braking torques can be generated with an adjustable frequency. In particular, such feedback can be generated as a function of the position and/or the movement parameter of the steering unit and/or an operating state of the vehicle and/or the user property. For example, the feedback can be used to warn you about dangerous maneuvers or to wake you up when you are tired. The feedback can also serve as a signal for a lane change.

In all of the configurations, it is preferred that the steering control device is suitable and designed to determine user behavior using at least one machine learning algorithm (also referred to as artificial intelligence) and to take it into account when setting the braking torque. In particular, data is continuously recorded and evaluated for this purpose. For example, the movement of the steering unit can be damped depending on existing muscle strength or tiredness or driving behavior. Image recognition can support this. If this recognizes a distorted face (certain gesture) when parking, for example, the support power can be increased. It is also possible that age-related changes in the steering device or other parts of the vehicle are taken into account.

The magnetorheological medium preferably comprises at least one metallic powder. In particular, the metallic powder has a volume fraction of at least 50% and preferably at least 60% or also at least 70%. A particularly low basic torque can be achieved by using such a medium. At the same time, due to the high volume fraction, a particularly high maximum braking torque can be achieved. In addition, such a medium can be used with the same properties at the temperatures to be expected for the steering device. The powder is in particular taken up in a gaseous carrier medium and, for example, air.

The metallic powder is preferably in the form of carbonyl iron powder (pure iron) or at least includes such a powder. Other magnetorheologically addressable powders are also possible.

The metallic powder is particularly preferably provided with a coating.

The steering device can include at least one remanence device and/or at least one permanent magnet unit, which is suitable and designed to maintain a braking torque with at least one of the at least two brake gap sections even without the supply of electrical current. The remanence device is in particular operatively connected to the steering control unit. In particular, the remanence device is provided by at least one of the coils.

The steering device can include at least one safety device. The safety device is particularly suitable and designed to at least partially remove the magnetorheological medium from the gap. In particular, the safety device can remove the medium at least far enough for the steering unit to be essentially freely movable. In particular, the safety device can eliminate the braking torque and/or the basic torque. For example, the magnetorheological medium is removed from the gap by means of overpressure and/or under pressure. The safety device can include at least one pressure vessel and/or a detonator cap or the like. Such a safety device serves as an emergency system in the event of a fault in the braking system (so-called fail-safe mechanism.).

In all configurations it is particularly preferred that the braking device, in particular the first and/or second component and/or the gap, has a maximum diameter of less than 100 mm (in particular with a maximum braking torque of at least 25 Nm). As a result, the braking device can be accommodated in a particularly space-saving manner (e.g., in the dashboard). The braking device presented here is particularly suitable for such a maximum diameter.

In all configurations it is preferred that the steering device comprises at least one drive device for generating a drive torque for the active movement of the steering unit. The drive device serves in particular to generate a drive torque against which the steering unit must be moved manually. The drive device can also be used to return the steering unit to a basic position. In particular, the drive device comprises at least one electric drive and, for example, an electric motor. The electric motor can also be a pancake, traveling wave or axial flux motor. In addition, or as an alternative, the drive device can also include at least one force accumulator and, for example, a spring or the like.

In particular, the maximum braking torque of the second brake gap section is at least twice the maximum drive torque of the drive device. In particular, a maximum drive torque of less than or equal to twelve Newton meters and preferably less than or equal to eight Newton meters can be generated with the drive device.

If the drive device fails, the braking device can preferably provide a braking torque which is at least as high as its drive torque. Such a steering device is particularly safe and reliable because the two Braking gap sections together with the possibility to compensate the drive device offer a triple redundancy.

The braking device presented here offers the particular advantage in combination with the drive device that the drive device and e.g., an electric motor can be dimensioned significantly smaller. In addition, all moments that are to be applied passively can be taken over by the braking device. As a result, electrical energy can be saved, which is of great advantage, especially in electric vehicles.

The much smaller (weaker) electric motor can no longer easily snatch the steering wheel out of the driver's hand in the event of a malfunction (e.g., incorrect sensor signal). In addition, the magnetorheological brake unit can counteract and over brake the electric motor if implausible states are detected (the electric motor wants to hit hard even though the vehicle is driving at high speed on a freeway).

It is preferred and advantageous that the steering control device is suitable and designed to at least approximately compensate for (regulate) fluctuations in the drive torque of the drive device by adjusting the braking torque (in particular with the first brake gap section). In particular, the fluctuations can be compensated to such an extent that they can no longer be felt haptically on the steering unit. Such fluctuations relate in particular to changes in the drive torque over the angle of rotation. In particular, the steering control unit is suitable and designed to control the drive torque essentially constantly over the angle of rotation.

The disc contour can include at least one star contour. In particular, in the area of the star contour, there is a variable gap height over the circumference of the braking gap section. In particular, magnetic field concentrators are arranged on the star contour. In particular, the magnetic field concentrators project radially into the braking gap section. Such a star contour reduces the friction surface between the parts rotating in relation to one another, which means that the basic torque is particularly low. At the same time, the star contour results in a so-called heap formation for the magnetorheological medium, which enables particularly high braking torques.

In a particularly preferred and advantageous embodiment, at least three braking gap sections are provided. In particular, at least one third brake gap section is arranged axially between a first brake gap section and a second brake gap section. In particular, at least one first electrical coil is assigned to the first brake gap section and at least one separately controllable second electrical coil is assigned to the second brake gap section. In particular, both the first and the second electrical coil are assigned to the third brake gap section.

The redundancy provided by such a system with two electrical coils is also advantageous. If one coil should fail, the second coil can still generate a magnetic field and thus a controllable torque across the braking gap, although not with the same quality. This is very beneficial for applications that require a high level of reliability.

At least two (functionally) different (in particular radially and/or axially) brake gap sections can be provided. The braking gap sections are e.g., formed separately from each other and separated from each other in advantageous embodiments in the axial direction.

It is possible that at least partially different materials are used on the first braking gap section and the second braking gap section. In particular, in the areas of the first brake gap section and the second brake gap section, the materials used on the core and/or the shell part differ at least in sections. The same or different materials and constructions can be used for the electrical coils.

The at least two braking gap sections can have different running clearances and gap dimensions and/or gap contours and gap profiles (of the parts moving towards one another). A small gap height can result in higher moments, but is often more difficult to control in terms of control technology. A large gap height usually behaves in the opposite way (lower moment, but overall better controllable). Depending on the requirements, one (first) or the other (second) coil can be energized. For example, an end stop (stop, barrier) usually requires very high torques and little control technology, since the actuator is virtually stationary (standstill). Here a small gap (gap height) or possible rotating bodies/rollers in the braking gap section are efficient. Braking that is as constant as possible at higher speeds, on the other hand, regularly requires high control quality; a larger gap height and/or a disc/star contour on a braking gap section is advantageous here.

The first braking component defines an axial direction. In particular, an axis of symmetry of the first braking component is the axis of rotation. Preferably, the core of the first brake component extends in the axial direction, but may also have a slight angle to the axial direction.

The invention makes it possible to generate a high braking torque at different speeds in a small space. The magnetic field passes through the two different braking gap sections between the core and the casing part, each essentially radially or at least transversely to the axis of rotation.

In preferred developments, the first electrical coil and the second electrical coil configured differently. The first electrical coil and the second electrical coil preferably differ in at least one parameter from a group of parameters, which group includes the wire diameter and the wire cross-section, the number of windings, the winding window, the winding type, the coil width, the coil diameter and the material as parameters.

A radius or (typical or maximum) diameter of the first brake gap section is preferably approximately and in particular exactly the same size as a radius or (typical or maximum) diameter of the second brake gap section and/or the third brake gap section. This means that large torques can also be generated at higher speeds and when starting from a standstill.

The magnetorheological medium particularly wets the first and the second brake component at least in sections.

The first electrical coil and the second electrical coil are preferably wound around the axis of rotation and substantially generate a magnetic field in the axial direction within the core. The two electric coils are taken up radially between the core and the casing part. The electrical coils can be wound around the core or attached to the inside of the casing part.

The core consists of a magnetically (well) conductive material. The first braking component comprises the core and in particular an axle or a shaft which in particular consists at least partially or completely of a magnetically non-conductive material. Preferably, the axle (the shaft) and the core are detachably connected to each other.

The disc contour consists at least partially or completely of a magnetically (well) conductive material.

In a preferred embodiment, the disc contour is as separate disc body formed. It is also possible that the disk contour is formed in one piece with the core and e.g., T-shaped, with the long leg of the "T" running along the axis of rotation. It is also possible that part of the disc contour is designed in one piece with the core and is supplemented by a separate disc body. In simple and particularly preferred ones configurations, the disk contour is formed by a separate disk body that is attached to or on the core.

The disk body is preferably applied to the core. For this purpose, the core has, in particular, an adapted receptacle. It is possible and preferred, for example, for the disc body to be connected or pressed onto the core. However, it is also possible for the disk contour or the disk body to be connected to the casing part and, for example, to be pressed into it. It is also conceivable that two disk bodies adapted to one another are used, between which a radial brake gap section is formed. A first hollow-cylindrical disk contour can be applied to the core and a second hollow-cylindrical disk contour with a correspondingly large inner diameter can be introduced into the casing part, so that the two disk contours are aligned with one another in the axial direction, for example, and leave a small (radial) gap between them. Between the two disc contours then remains a brake gap section which is in particular essentially radial in design.

In particularly preferred configurations, the pane contour has at least one pane pack. The pack of disks is formed in particular by a plurality of sheet metal disks that preferably lie directly against one another. Such a configuration enables, for example, the production of the sheet metal discs as a stamped part. Punched parts can be produced particularly easily and inexpensively in large numbers. If they are stacked on top of one another and, for example, pressed together, a disk package or a disk body with a significantly greater thickness can be provided easily and inexpensively. As a result, sheet metal panes and also pane packs can be produced very cost-effectively.

It is preferred that at least some sheet metal disks or almost all sheet metal disks or all sheet metal disks are each round and have the same diameter or at least similar diameters. However, it is also possible to use a few or individual non-round disc plates on which, for example, a non-round outer contour or a toothed structure or star contour is formed radially on the outside. If circular and non-circular disk sheets are stacked to form a disk pack, a complex outer contour can be created, which can locally lead to a greater magnetic field concentration. It is also possible for a disk pack to include a plurality of round (or non-round) disk sheets with different outside diameters. In this way, round sheet metal plates with a smaller and a larger diameter can be provided alternately.

Individual discs can also have different properties (e.g., due to different material). Individual discs can also be made of (sintered) magnetic material (e.g., neodymium).

In particularly preferred configurations, the disc contour has a cylindrical outer contour overall. It is also possible and preferred that the disc contour includes a star contour or is designed as such.

It is possible and preferred for the disc contour to have an (axially) outwardly protruding outer contour on at least one axial side. The disk contour can be conical, bulbous, rounded or stepped overall. In particular, the disc contour is rotationally symmetrical in the area of the outer contour. The outwardly projecting outer contour can, for example, be supported on a cover or the like or be guided there. The outwardly protruding outer contour thereby makes it possible to provide a reservoir of magnetorheological particles.

Preferably, the radial clearance in the second brake gap section and the gap height in the first brake gap section at the disc contour and the gap height in the third brake gap section are (considerably) smaller than a radial distance in other areas of the gap. The radial distance from the outer diameters of the electrical coils or from the outer diameter of a coating over the electrical coils or an extrusion coating of the electrical coils to the radial inner wall of the casing part is (axially) outside of the two brake gap sections preferably (considerably) larger than in the two brake gap sections. The difference in size can reach and far exceed a factor of 2 or 3.

Because of this very small amount of play, in many cases a separate bearing can be dispensed with, at least at the end with the disk contour. The disk contour then, together with the shell part, takes over the guidance or bearing of the shell part relative to the core. This enables an even simpler and more cost-effective construction.

In all configurations, the inner contour and/or preferably the casing part can be non-circular (e.g., elliptical . . . ). The core can be mounted eccentrically to the shell part. This results in a changing relative gap at certain points during the rotation (of the rotor to the stator).

In particularly preferred configurations, the electrical coils are arranged axially between the first and the second brake gap section. Particularly preferably, at least one braking gap section is axially directly or indirectly adjacent to one of the electrical coils.

In all configurations, it is particularly preferred that the Magnetic field of the magnetic circuits passes at least partially axially through the core and the shell part and to a considerable extent radially and particularly preferably essentially radially through the third brake gap section. Furthermore, a significant part of the magnetic field of the first electrical coil passes radially and particularly preferably essentially radially through the first brake gap section and that of the second electrical coil through the second brake gap section. In simple configurations, the electrical coils are each wound around the core and generate a magnetic field in the axial direction of the axis of rotation within the core, which is conducted radially outwards at the respective ends of the electrical coils and at one axial end through the disk contour and the first or second brake gap section and at the other axial end in each case passes through the third brake gap section from the core into the casing part or vice versa. Such a configuration allows a particularly simple, inexpensive and yet effective construction.

The disk contour particularly preferably guides the casing part in a rotatable manner and serves as a bearing point.

A closed chamber is preferably formed between the brake components. In particular, the closed chamber is at least to a significant extent and in particular essentially filled with a magnetorheological medium such as a magnetorheological fluid and/or e.g., (dry or powdered) carbonyl iron powder filled. In particular, the second brake component is rotatably received on the first brake component.

The first braking component preferably includes an axle formed at least in part from a non-magnetically conductive material. The core made of a magnetically conductive material is attached to the axle or an inner part. Preferably, the second brake component is axially displaceably received on the first brake component. This can (also) serve, for example, to enable volume equalization in the event of temperature changes and/or in the event of a leak. It is preferred that a radial and/or axial position of the two brake components relative to one another is detected by sensors.

It is preferred and advantageous that the (in particular absolute) position of the steering device can be detected. In particular, the (in particular relative) position of the brake components can be detected. In particular, not only the relative position of the brake components should be detected, but also the absolute position of the steering device. Since the steering device can have electrical connections, such as a clock spring, and this must not be torn off. For this purpose, at least one absolute sensor is installed, which detects the end of the steering stop. The brake then produces in particular an end stop. The absolute sensor is also necessary in particular when the vehicle is parked and the steering angle is not in the neutral position. When the vehicle is put into operation again, the steering control unit can thus recognize the steering angle of the wheels.

A torque sensor can also be installed in the steering train or the steering shaft.

In all of the configurations, it is preferred that a click element is arranged at one and in particular at the distal end of the chamber. Such a click element allows in particular two states, after pressing the click element e.g., switches over a metal sheet in an audible and/or tactile manner and thereby performs a (small) axial displacement. Such e.g., designed as snap parts or snap disks click elements are known for example from keyboards or other devices and allow an inexpensive and effective tactile feedback when pressing a button or the like. The click element is preferably arranged at one end of the chamber. An elastic membrane particularly preferably separates the chamber from the click element.

The click element can be designed as a snap part or snap disk. This can provide volume compensation to the chamber as the axle continues to enter or exit the chamber.

In particularly preferred developments, the snap-action disk is designed such that a change in the clamped volume of the snap-action disk between the two states of the snap-action disk is adapted to a cross-sectional area of the axis multiplied by an axial offset of the snap-action disk upon actuation. In particular, the two volumes differ by less than 50% or 25% and preferably by less than 10% or less than 5%. Such a configuration, in which the snap-action disk is adapted to the axis, ensures that only a small volume or possibly no volume at all has to be provided for volume compensation when the snap-action disk is actuated.

The use of a click element or snap part at the distal end of the chamber in connection with the formation of the first brake gap section with the disc contour also near the distal end of the chamber enables the casing part to be guided and supported in a particularly simple and effective manner, since there is only little radial play and the disc contour can therefore take over (in many cases) sufficient guidance in the radial direction of the shell part.

In preferred developments, a sensor device or at least one sensor device for detecting a relative angle of rotation between the core and the casing part is included.

A sensor device or at least one sensor device for detecting a relative axial position of the casing part in relation to the core is preferably included. Particularly preferably, the sensor device comprises or at least one sensor device at least one magnetic field sensor, which is designed to detect a rotation angle s and an axial position. In particularly advantageous configurations, the sensor device comprises at least one Hall sensor.

In simple, preferred configurations, the magnetic field sensor is accommodated on the stationary brake component and is exposed to a magnetic field acting in the radial direction. In addition, a rotation angle can be determined via the orientation of the magnetic field sensor relative to the magnetic field. An axial displacement of the sensor device relative to the casing part can be derived from an intensity of the magnetic field strength.

At least one shielding device for at least partially shielding the sensor device from a magnetic field of the electrical coil is particularly preferably included. The shielding device preferably comprises at least one shielding body. The shielding body is designed in particular to shield a magnetic ring unit for applying a defined (eg radial) magnetic field to the magnetic field sensor from interfering magnetic influences of the electric coil. For this purpose, the shielding body preferably gives at least sections of the magnetic ring unit. The shielding device preferably surrounds the magnetic ring unit on three sides, namely on both axial sides and radially outwards. The shielding device preferably comprises at least one separating unit arranged between the shielding body and the magnetic ring unit. As a result, the magnetic field of the magnetic ring unit is decoupled from the shielding body. Furthermore, at least one magnetic decoupling device arranged between the shielding body and the casing part is preferably included. The separating unit and/or the decoupling device preferably have a magnetic conductivity that is many times lower than that of the shielding body. The shielding device and the magnetic ring unit are preferably arranged at a distance from one another.

A shielding device enables a significant improvement in the measurement quality. In particular, fine angular resolutions and small axial distances can be detected as a result.

The magnetic coil is preferably controlled mostly or predominantly during the operating time with a voltage of in particular 12V. In terms of haptics, it is (often) of considerable advantage if the braking torque of the magnetorheological braking device reaches the maximum or set value as quickly as possible. This is sometimes only possible with a greater voltage. A maximum braking torque is generally achieved by a maximum magnetic field in the braking gap. Since the magnetic field is generated by the current in the electrical coil (magnetic coil), the current must also be set to its maximum value as quickly as possible. In principle, you can always set the voltage to a high value, in this specific case instead of e.g., 12V to e.g., 24V. For this, however, all components (electrical coil or magnetic coil, the coil wire, etc.) would have to be designed differently (and e.g., a wire with a larger diameter would be used).

Therefore, in preferred refinements and developments, a higher voltage is set at least (in particular only) at the beginning of a haptic feedback (than would be necessary, for example, in continuous operation). In particular at the beginning or almost immediately after haptic feedback, a higher voltage is set (e.g., higher by a factor of 1.5 or 2 or 3 than would be necessary in continuous operation). In particular, the higher voltage is maintained until the current (or magnetic field) reaches the desired maximum value (close to, e.g., 90% or 95%) and/or the period of time that the higher voltage can act is reached or exceeded. Thereafter, the voltage to the lower voltage of e.g., regulated back 12 V. The system reacts faster and that desired braking torque is set more quickly.

In modern electric cars in particular, there are several voltages in the vehicle and high voltages/currents are possible, so that they do not have to be generated or transformed separately. Much higher voltages are also available in these electric vehicles (e.g., up to 800 volts) and such current strengths are possible that the properties described above can be used to advantage.

In particular, the magnetic field strength between individual magnetically polarizable particles of the magnetorheological medium is greater than 300 kA/m. In particular, the magnetic field strength that can be generated in the gap, preferably in at least one of the braking gap sections, is greater than 500 kA/m.

In particular, the steering device comprises at least four braking gap sections. In particular, at least one common coil is provided for each two brake gap sections.

The steering device can include at least two magnetorheological braking devices. In particular, a movement of a common (single) steering unit can be braked with the braking devices. In particular, the braking devices are coupled to one another mechanically and/or electrically for this purpose.

The method according to the invention is used to operate a steering device with a magnetorheological braking device with two braking components, with the two braking components being continuously rotatable relative to one another about an axis of rotation, with a first braking component extending along the axis of rotation and comprising a core made of a magnetically conductive material and with the second braking component comprises a hollow shell member extending around the first braking component, with at least three axially spaced and circumferential and at least partially connected between the first and second braking components Magnetorheological medium-filled brake gap sections are formed. A first electrical coil generates a (first) controlled magnetic field in a first brake gap section. Irrespective of this, a second electrical coil generates a (second)

controlled magnetic field in a second brake gap section in order to generate braking effects of different strengths, in particular depending on the speed. In this case, the magnetic fields of the first and second electric coils are in particular both closed via the third braking gap.

The method according to the invention also solves the task set out above in a particularly advantageous manner. The method is designed in particular in such a way that the steering device according to the invention can then be operated. In particular, the steering device can be operated according to the method according to the invention.

In the context of the present invention, a blocking is understood in particular to mean that no movement of the steering unit (in at least one direction of rotation and/or in both (all) operational directions of rotation) can take place with manual force to be applied during operation. In particular, the mobility of the steering unit can also be released by means of the braking device. In the context of the present invention, a release is understood in particular to mean that there is only an operational basic torque (also referred to as idling torque) of the braking device without an additional magnetorheological delay being applied, for example by energizing the coil. If mobility is enabled, the magnetorheological braking device is in particular inactive, so that no field for actively influencing the magnetorheological medium is generated.

Further advantages and features of the present invention result from the exemplary embodiments, which are explained below with reference to the enclosed figures.

DETAILED DESCRIPTION OF THE INVENTION

Figure 1:
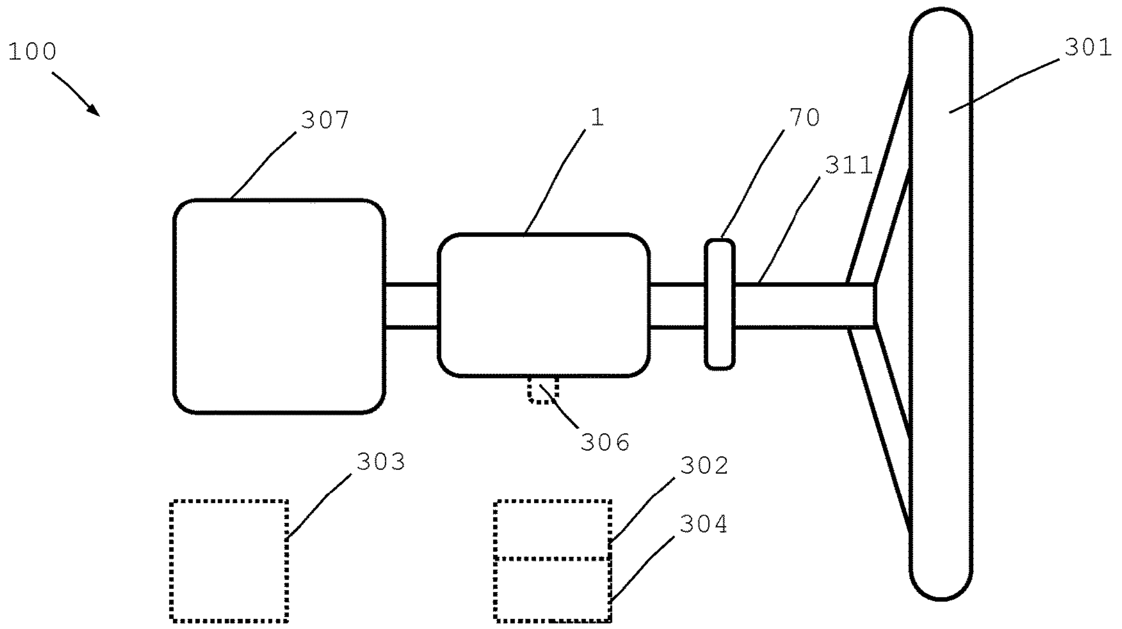
FIG. 1 is a purely schematic representation of a steering device according to the invention with a magneto-rheological braking device's.

FIG. 1 shows a steering device 100 according to the invention for steering a vehicle, not shown in detail here, by means of a steering unit 301. The steering unit 101 is designed here as a rotatable steering wheel which is connected to a steering shaft in a rotationally fixed manner.

The steering device 100 is here as a steer-by-wire steering system educated. An actuator device 303 is used for this purpose to convert the steering movement carried out with the steering unit 301 into a vehicle movement. For example, the actuator device 303 steers the vehicle wheel or wheels. Actuator device 303 is only electrically connected to steering unit 101.

The rotational movement of the steering unit is detected by means of a sensor device 70 and, for example, a rotational angle sensor. Depending on the angle of rotation, the actuator device 303 then steers e.g., the vehicle wheel or wheels. It can thus e.g., the front and/or the rear wheels are steered or in a tricycle the tilt of the tricycle. It can also be used to steer the wheels of the front axle and rear axle or even all axles (so-called crab steering).

A drive device 307 designed as an electric motor is connected to the steering shaft 311 here. The steering unit 301 can be actively rotated by the drive device 307. As a result, the steering unit 301 is actively moved, for example when cornering, as would also be the case with a conventional mechanical steering system.

The movement of the steering unit 101 can be braked in a targeted manner by means of a magnetorheological braking device 1. To control the braking device 1 and also the drive device 307 depending on various parameters and e.g., the steering angle, a steering control unit 302 is provided here. For this purpose, the steering control unit 302 is operatively connected to the sensor device 70.

The steering control unit 302 also takes into account, for example, data from a driver assistance system 304. As a result, the movement of the steering unit 301 can be influenced in a targeted manner depending on the driving situation. The steering control unit 302 can also be operatively connected to other sensors, not shown in detail here, in order to Being able to specifically influence steering behavior as a function of other parameters.

The braking device 1 is equipped here with a safety device 306 which removes a magnetorheological medium 6 (not visible here) from a gap 5 (also not visible here). In the event of a fault, for example, the braking torque can be canceled very quickly and reliably. The gap 5 and the medium 6 are presented in more detail with reference to the following figures.

Figure 2:
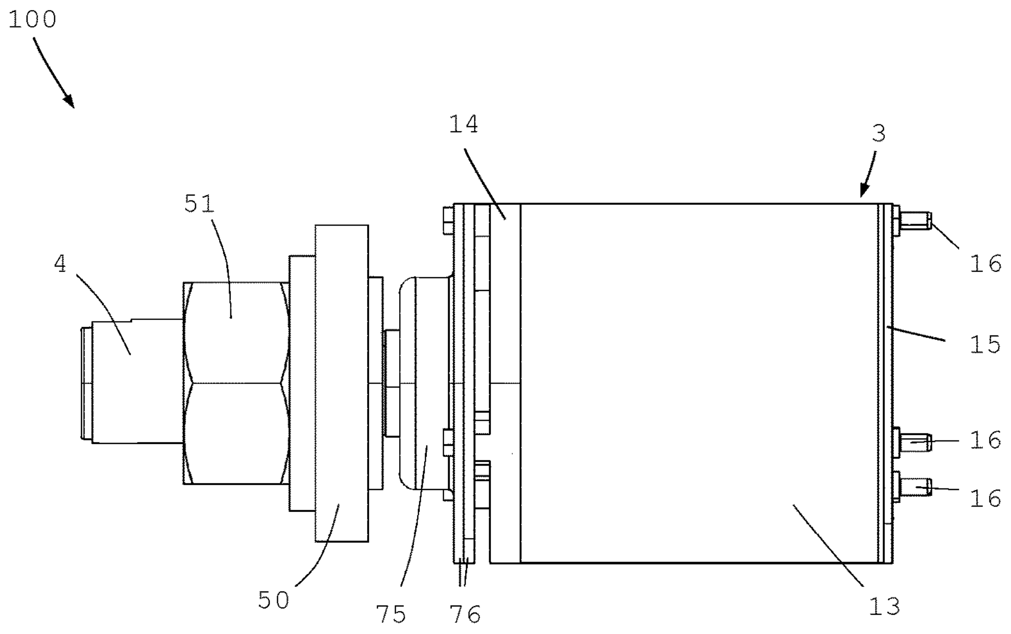
FIG. 2 shows a side view of a braking device.

FIG. 2 shows a side view of a brake device 1 with a holder 4 which can be fastened to a bracket 50, for example, via a nut 51. The braking device 1 has two braking components 2, 3, of which the inner braking component 2 is not visible in FIG. 2. The inner brake component 2 is connected to the holder 4. The holder 4 and the inner brake component 2 are designed to be stationary here. The other brake component 3 includes the casing part 13 and is rotatably accommodated on the first brake component 2.

The braking device 1 has a compact design and inside the shielding device 75, which has a two-part shielding body 76 as a shielding housing, has a sensor device 70 (not visible here) for detecting the rotational position and the axial position of the casing part 13. The casing part is connected via pins 16 13 is connected to a left lid 14 and a right lid 15 to seal an inner closed chamber 110.

Figure 3A:
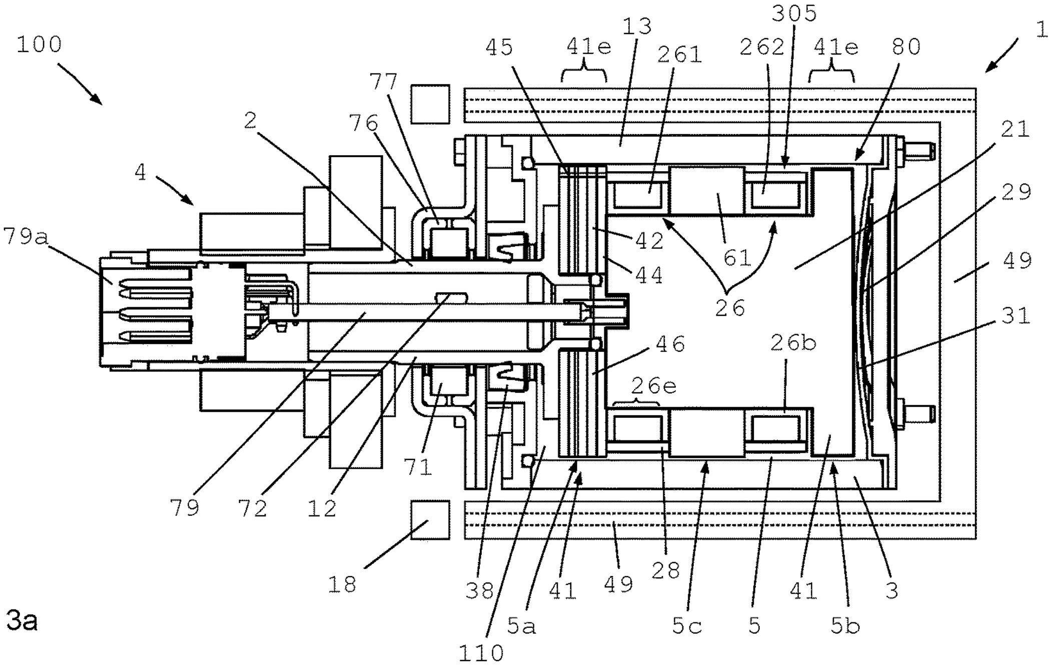
FIGS. 3*a*-3*c* different sections of braking devices.
Figure 3B:
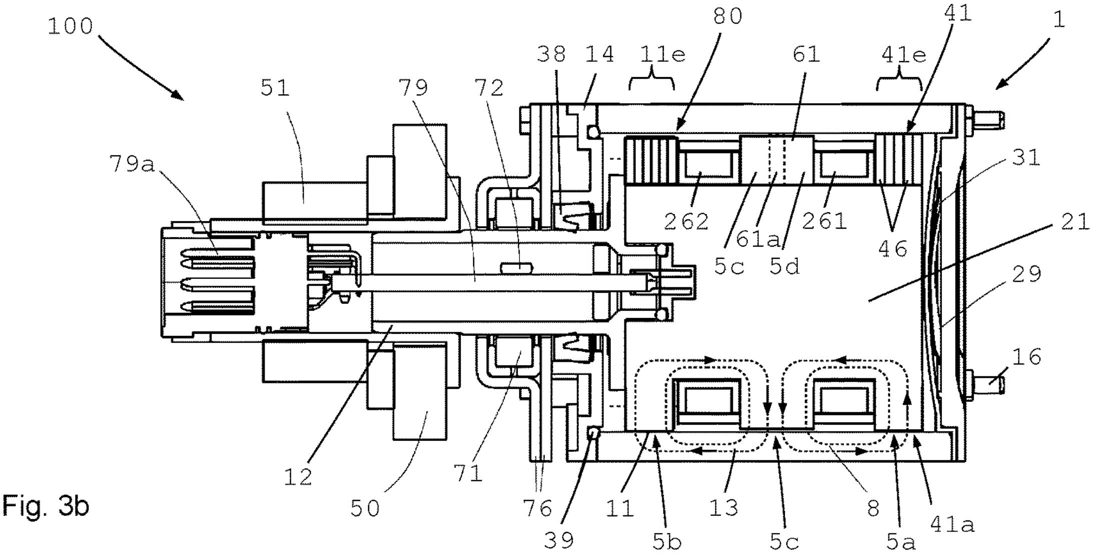
Figure 3C:
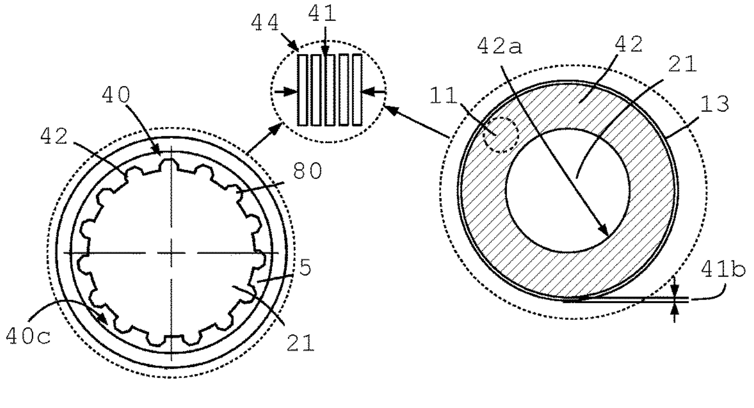

Shown in the FIGS. 3*a* to 3*c* are possible cross sections of a braking device 1 e.g., from FIG. 2. Mounted on the bracket 4 is the brake component 2 extending in the axial direction and to which the core 21 is fixed. The core 21 is surrounded radially by the (magnetically conductive) casing part 13 as the outer or second brake component 3.

The magnetically conductive core 21 is made up of two electric coils 26, which are wound around the core 21. The first electric coil 261 extends over an axial width 26*e*. At the end of the core 21 facing the holder 4, a disk contour 41 is formed, which is applied here to the core and e.g., is pressed. For this purpose, the disk contour 41 has a disk body 42 of hollow-cylindrical design. The receptacle on the core can also be non-round.

In particular, the core 21 can be made of sintered material (metal). The core can thus be manufactured more easily in the desired shape.

The disk body 42 consists here of a disk pack 44 which is formed by a plurality of thin disk plates 46. Here, the sheet metal disks 46 are each formed as a stamped part and can be stamped out, for example, from a magnetically conductive sheet metal with a thickness of 1 mm or 2 mm or even 3 mm. In this way, the required number of sheet metal panes can be punched out easily and inexpensively in order to produce the desired thickness of the pane body 42.

The individual disc plates 46 are pressed together and applied to the core 21 and thus, for example, screwed or pressed. A braking gap section 5*a* remains in the area of the disc body 42 with a small gap height 41*b* between the outer diameter of the disc contour 41 and the inner circumference of the casing part 13. The axial width 41*e* of the disc contour 41 or its braking gap section 5*a* is determined here by the number of disc laminations 46 and can be larger or smaller than shown.

Here, the disc contour 41 is axially directly adjacent to the first electrical coil 261, which is accommodated in a coil holder 26*b* and is completely sealed radially on the outside by a casting compound 28.

The disc body 42 is connected to the core 21 and the fixed brake component 2 and rotates in the operation not. This enables a hole or recess to be formed for the cables 45 to be fed through for the electrical connection of the first and second electrical coils 261, 262. The electrical coils 261, 262 can thereby be connected simply, inexpensively and quickly.

The disk contour 41 is formed here at the proximal end, that is to say at the end of the core 21 which faces the holder 4. At the distal end, i.e., at the other end of the core 21, a second braking gap portion 5*b* is formed. The second brake gap section 5*b* extends over an axial width 11*e*. A disc contour 41 is also arranged there, which is shaped analogously or identically to the disc contour 41 of the proximal end in terms of its geometry. But it is also possible that the disc contour 41 is shaped differently than the disc contour 41 of the proximal end and e.g., in the gap height or in the degree of change in the gap height (a star contour 40) differs. In contrast to the disk contour 41 of the proximal end, the disk contour 41 is formed here (circumferentially) in one piece with the core, as is shown schematically in the lower part of FIG. 3*b*. However, the disk contour 41 can comprise a (circulating) disk package with a plurality of disk plates 46.

The second braking gap section 5*b* allows a very high braking torque to be achieved with the second electrical coil 262, in particular at low speeds of rotation of the casing part 13. Through the first brake gap section 5*a* in the area of the disc contour 41, a still strong magnetic field can be transmitted from the core 21 to the casing part 13 with the first electrical coil 261 at high speeds, since the gap height 41*b* is considerably smaller than the radial free space 11*c* in the area whose brake gap section is 5*b*. As a result, a high torque can be generated, which is also made possible, in particular, at higher speeds. As a result, through targeted and separate activation of the two electric coils 261, 262 a high and finely adjustable torque can be made available over the entire speed range.

The axial width 11*e* of the second brake gap section 5*b* and the width 41*e* of the first brake gap section 5*a* are approximately the same here (+/−25%) and each shorter than an axial width of the third brake gap section 5*c*. Overall, a very compact structure is achieved.

The casing part (jacket part) 13 is surrounded by a coating 49 as a rotary knob 23 in FIG. 3*a*. The knob 23 is at least partially transparent so that it can be illuminated by the lighting means 18 in the form of LEDs, for example. The lighting can be controlled depending on the situation or independently of the situation. This design is primarily intended for steering devices for computer games, but can also be used to advantage in vehicles.

At the front end, the closed chamber 110 inside the casing part 13 is closed off by a front cover 14 through which the brake component 2 is passed. A seal 38 is used for sealing. At the rear or distal end, the chamber 110 is initially delimited by an elastic membrane 31, which is adjoined to the outside by a click element 29 designed here as a snap-action disk.

The second coil 262 or the associated core material is also designed here as a remanence device 305. If the retentivity device 305 was previously activated, a magnetic field that influences the medium 6 and thus maintains a braking torque remains even after the power supply has been switched off. For example, a steering wheel lock can be enabled without additional power consumption. A parked vehicle should consume as little electricity as possible, preferably none at all, otherwise the battery could be drained (both in vehicles with a combustion engine and in electrically powered vehicles). The steering wheel lock should therefore also switch on when it is not powered apply high locking torque. A remanence device can provide this.

FIG. 3*b* shows a slightly different representation of a braking device 1, in which case, in contrast to FIG. 3*a*, the cover 49 or the rotary knob 23 has been omitted.

An essential difference between FIGS. 3*a* and 3*b* is that in FIG. 3*b* the first braking gap section 5*a* with the disk contour 41 is provided at the distal end of the casing part 13, while the second braking gap section 5*b* is provided at the proximal end of the casing part 13.

In this configuration, for example, outside of chamber 110 between seal 38 and sensor device 70 there can also be a bearing for mounting jacket part 13 with respect to brake component 2. However, it is also possible here for the bearing to take place at one end only via the seal 38 and at the other distal end only via the disk contour 41.

The disk contour 41 can be formed (circumferentially) in one piece with the core, as is shown schematically in the lower part of FIG. 3*b*. Or the disk contour 41 comprises a (circular) disk pack with a plurality of disk plates 46, as is shown by way of example in the upper part of FIG. 3*b*. The disk contour can also be placed on the core as a solid separate part, that is to say it can practically consist of a single disk sheet of correspondingly greater thickness.

Some magnetic field lines 8 of the first electric coil 261 and the second electric coil 262 are drawn in as an example in FIG. 3*b*. Furthermore, it can also be seen that in each case an (approximately) radial passage of the magnetic field lines 8 takes place in the braking gap sections 5*a* and 5*b*. In the braking gap portion 5*a*, at higher speeds, a higher Torque generated while in the braking gap portion 5*b* at higher torque is generated at lower speeds. The respective magnetic field is closed in each case in the central area by the (roughly) radial transition to the third brake gap section 5*c*. There is practically a thin gap at the braking gap section 5*c*, similar to the first braking gap section if a cylindrical disk contour 41 is used there.

The magnetic field sensor 72 is mounted on a sensor circuit board 79 and can be contacted via the contact pins 79*a*. The electrical coil 26 is also supplied with current via this.

At least in the area of sensor device 70 and magnetic field sensor 72, inner braking component 2 is preferably made of a material that is not magnetically conductive or has little or no magnetic conductivity, in order to enable detection of the orientation and intensity of the magnetic field of magnetic ring unit 71 in the interior of axle 12 or the to ensure first brake component 2. The sensor device 70 is accommodated there in a particularly protected manner (protection from water and dust).

An O-ring 39 can be seen in FIG. 3*b* which seals the cover 14 against the casing part 13.

The third braking gap section 5*c* is formed on the ring contour 61. The ring contour 61 can be slid onto or attached to the core 21 as a separate ring, or the ring contour 61 is formed in one piece with the core 21. In any case, the ring contour 61 is coupled to the core 21 in a magnetically conductive manner.

In a purely schematic manner, the top half of FIG. 3*b* shows an alternative embodiment in which a fourth braking gap section 5*d* is integrated. The fourth brake gap section 5*d* can, for example, arise from the fact that the annular contour 61 provides two separate braking gap sections 5*c* and 5*d*. For example, two magnetically conductive ring parts can be included, which are separated from one another by a magnetically less conductive intermediate part or ring part 61*a*. then two axially separate brake gap sections 5*c* and 5*d* are formed. In other configurations, the electrical coils 261, 262 and the brake gap sections 5*c*, 5*d* can also be arranged further apart from one another, so that two magnetic circuits which are further separated from one another are produced.

A structure with three braking gap sections, with the central braking gap section 5*c* being provided for both electrical coils 261, 262, enables a particularly compact structure.

A structure as shown in FIG. 3*a* or 3*b* provides an advantageous embodiment. The second electrical coil 262 enables a particularly strong braking torque in the second brake gap section 5*b* via the rolling elements 11, in particular at low speeds or at a standstill. At higher speeds, the first electrical coil 261 enables a high braking torque via the very small gap height in the first braking gap section 5*a*.

If a rotational movement is to be braked and a stop is to be made available, the first electric coil 261 on the first brake gap section 5*a* enables greater braking at higher speeds than the second electric coil 262 on the second brake gap section 5*b*. At a relatively low transition speed, the braking torque that can be generated with the second electric coil 262 in the second brake gap section 5*b* becomes greater than the braking torque that can be generated in the first brake gap section 5*a* at this speed. Optimum conditions can thus be set for different speeds via a combination of specifically different braking gap sections 5*a*, 5*b*.

A magnetorheological medium which comprises magnetorheological particles 19 is accommodated in the chamber 110. A gap 5 is provided in the chamber 110 between the brake components 2 and 3. At the gap 5, the three braking gap sections 5*a*, 5*b* and 5*c* are formed. Chamber 110 is at least partially filled with a magnetorheological medium 6 here. The medium here is preferably a magnetorheological fluid which, for example, comprises an oil as the carrier liquid, in which ferromagnetic particles 19 are present. Glycol, grease, water and viscous materials can also be used as a carrier medium, but are not limited to them. The carrier medium can also be gaseous or the carrier medium can be dispensed with (vacuum). In this case, only particles 19 that can be influenced by the magnetic field are filled into the chamber 110.

The ferromagnetic particles 19 are preferably carbonyl iron powder, with the size distribution of the particles depending on the specific application. A particle size distribution of between one and ten micrometers is specifically preferred, although larger particles of twenty, thirty, forty and fifty micrometers are also possible. Depending on the application, the particle size can also become significantly larger and even reach the millimeter range (particle balls). The particles can also have a special coating/shell (titanium coating, ceramic, carbon shell, etc.) so that they can better withstand the high pressure loads that occur depending on the application. For this application, the magnetorheological particles can be made not only of carbonyl iron powder (pure iron), but e.g., can also be made of special iron (harder steel).

It is possible that only particles that can be influenced by the magnetic field are filled into the gap 5 or the chamber 110, with air or an inert gas being added if necessary. if e.g., only air or another gas is used, different solids can be mixed to improve certain properties. For example, graphite powder can be admixed to reduce the friction between the carbonyl iron particles since graphite has a lubricating effect. The particles can in particular with PTFE be coated. In particular, a coating with PTFE or a comparable coating prevents the particles from clumping together and forming larger heaps. Such larger heaps do not disintegrate easily or may not disintegrate at all. Alternatively, the disk bodies or roller bodies can be coated with PTFE to reduce friction. When using MRF without oil or other liquid as a carrier medium, it must be ensured that no water condenses in the brake chamber (MR space or MRF space). For example, silicic acid gel (known as silica gel) or another desiccant that absorbs water and thus removes moisture from its surroundings can be mixed in.

If powder is used without a carrier liquid, up to about 80 percent by volume of carbonyl iron (iron powder) is possible, which greatly increases the braking torque if the remaining design parameters are adjusted accordingly (e.g. the field strength per particle should remain the same as with a magnetorheological fluid (MRF), i.e. the field strength in the braking gap or active gap should be twice as high when changing from, for example, LORD MRF 140 (40 percent by volume carbonyl iron with e.g. oil as the carrier liquid) to 80% carbonyl iron powder (without carrier liquid). We are talking about magnetic field strength in the gap of greater 200 kA/m up to values of up to 1,000 kA/m (1000000 A/m) or more. Another advantage of powder as a medium in the active gap is that there is no sedimentation and no accumulation in the sense of "the iron particles MR liquids are pulled in the direction of the magnetic field gradient (the force on magnetizable particles always acts in R direction of the stronger magnetic field, the carrier medium is displaced)" must come in order to obtain such high particle concentrations. The maximum particle concentration is already there. This improves the reproducibility of the torques (a similar braking torque always occurs with the same current).

In all configurations, it is particularly preferred that the Magnetic polarizable particles (to a significant extent) include non-round particles (non-spherical particles) in which a ratio of the largest diameter to the largest transverse extension perpendicular thereto is greater than 1.25 or 1.5. It is also possible to form this ratio as a ratio of the greatest longitudinal extent to the greatest transverse extent, with the longitudinal and transverse extents in particular being measured perpendicular to one another.

The use of out-of-round particles is particularly advantageous since they enable an effective canting structure, since different out-of-round sections of the particles jam or wedge with one another.

Ratios of the largest diameter to the largest transverse extension perpendicular thereto of 1.75 or 2.0 or more are also possible and preferred.

At least some of the magnetically polarizable particles are preferably designed to clamp or wedge together over a large area under the influence of the magnetic field. This is possible, for example, with particles that are angular in sections or, for example, are triangular or polygonal overall or the like. Two (or more) correspondingly configured particles then jam together and can cause the particles to clump together very effectively and cause the two brake or clutch components to jam and brake together.

At least some of the magnetically polarizable particles are preferably designed to clamp or wedge together under the influence of the magnetic field at two or more locations spaced apart from one another. Particles of this type, which are non-round, permit a very effective increase in the braking force or the braking moment, since, in contrast to spherical particles, they do not only touch at one point or in a small angular range, but rather at several points or even flat.

Preferably, at least some of the magnetically polarizable particles have at least one trough section. Such an inwardly curved trough section allows particularly effective wedging with parts of other particles.

Preferably, at least one surface of at least one clutch or brake component adjoining the brake gap is designed to be non-smooth or (locally) uneven at least in sections. It is also possible that the particles or a significant part of the magnetically polarizable particles have elevations or elevations and/or depressions regularly or irregularly on the outer surface. As a result, canting with the particles can be reinforced. For example, at least one surface can have elevations and/or depressions in the manner of pointed or rounded dimples in golf balls. A surface with a pointed or rounded sawtooth profile is also possible. A relative height (at least some) of the peaks or valleys is preferably at least 5% or 10% of the minimum diameter of a magnetically polarizable particle.

It has been found that a particularly effective canting and jamming of individual particles can be generated with high magnetic field strengths. For this purpose, a magnetic field strength of greater than 150 kiloamperes/meter (kA/m) or of 250 kiloamperes/meter or 500 kA/m or more is preferably generated in the gap. In particular, a magnetic field strength greater than 500 kiloamperes/meter (kA/m) or 750 kiloamperes/meter or 1000 kA/m or more can be generated or is generated in the gap, preferably in at least one of the braking gap sections.

If only powder without liquid carrier medium is used, a different type of seal can be selected and the basic friction thereby be reduced. The seal does not have to be pressed as hard against the surfaces, since it is not necessary to seal for liquids, only particles. A non-contact shaft seal such as a labyrinth seal can also be used, for example. This type of seal only rests on one of the two mutually rotating parts. In addition, the temperature dependence is reduced or almost eliminated. Liquid carrier media change their viscosity with changing temperatures, while carbonyl iron powder hardly changes its properties in very large temperature ranges (until the Curie temperature is reached). The temperature-related volume change is also negligible for powder, since the particles can redistribute among themselves if the volume of the individual particles changes.

The maximum volume fraction of carbonyl iron particles in powder form (approx. 74%) is also higher than in MRF with e.g., oil as a carrier medium.

The magnetorheological particles 19 chain together when a magnetic field is applied, as shown very schematically on the left in FIG. 3*c*. This creates a wedge effect, which leads to a significant increase in the braking torque at low and medium speeds.

Figure 4A:
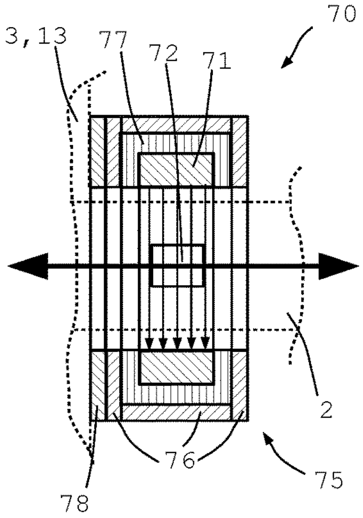
FIGS. 4*a*-4*b* is a highly schematic view of a sensor device and measurement results.

For a more detailed explanation of this effect, reference is made to FIG. 4 of the applicant's international application WO 2018/215350 A1, which, with regard to the explanation of the effect, is fully included in the scope of disclosure of this application in an adapted manner.

FIG. 3*c* shows basically schematic cross sections of the braking gap sections 5*a* and 5*b* and 5*c*. A cross section through the first or also the third brake gap section 5*a*, 5*c* in the area of the disc contour 41 is shown on the right in FIG. 3*c*. The disc contour 41 provides a disc body 42, which here rests on the core 21 is applied or is integrally formed as an annular flange on it. Radially on the outside between the outer contour of the disk contour 41 and the inner circumference of the casing part 13 there is a gap height 41*b* which is considerably smaller and can be chosen to be considerably smaller than the radial free space 11*c* in the second brake gap section 5*b*. The disc body 42 can be solid or can be designed as a disc pack 44 and include a plurality of disc plates 46. The first and the third braking gap section 5*a*, 5*c* can in principle have identical or similar cross sections.

A rolling body 11 is shown in dashed lines in the right-hand part of FIG. 3*c*, just as an example, in order to clarify the differences. It can be clearly seen that the disc body 42 allows a gap height 41*b* with a smaller height. As a result, a strong braking torque and a high magnetic field strength can be achieved and transmitted there. A desired magnetic field strength and braking effect can be set independently via the other electric coil in the second brake gap section 5*b*. Both magnetic fields are closed via the third brake gap section 5*c*.

A cross section of a further embodiment of a brake gap section is shown on the left in FIG. 3*c*. This braking gap section has a disk contour 41 designed as a star contour 40. The star contour 40 has a non-round peripheral surface. This creates a braking gap section with a variable gap height 40*c* over the circumference. This can also result in a kind of wedge effect and a high torque can be set, especially at low speeds. The elements projecting radially outward (or inward) can be referred to as magnetic field concentrators 80, which locally concentrate the magnetic field. A star contour 40 can also be in the form of a disk assembly 44 and can include a plurality of (e.g. star-shaped) sheet metal disks 46.

A star contour can also be formed in the axial direction this means that variable gap heights occur in the axial direction. As a result, the magnetic field can be concentrated in the axial direction at locations with a lower gap height and reduced in the higher gaps. A mixture of "radial" and "axial" and/or oblique star contours is also conceivable.

In particular, this configuration is suitable for the second braking gap section 5*b* as a replacement for a (second) braking gap section (5*b*) with rolling bodies.

The sensor device 70 is shown in detail in FIG. 4. The first brake component 2 and the second brake component 3 embodied here as a casing part 13 are only indicated (dashed lines). The sensor device 70 is supported in a magnetically decoupled manner via the decoupling device 78 on the rotatable second brake component. The shielding device 75 here consists of three shielding bodies 76 which reduce the scattering of the magnetic field 8 of the electrical coil 26. The shielding device 75 can also only consist of pot-shaped bodies or a pot-shaped body and a disc-shaped body that are connected to one another.

Figure 4B:
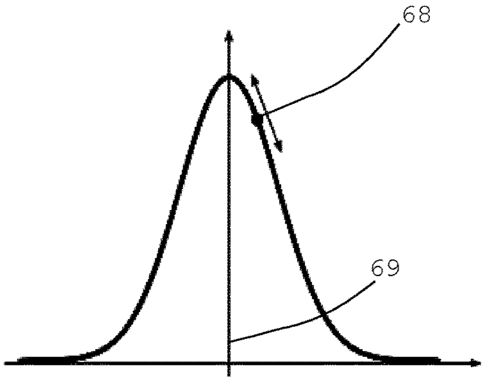
Figure 5:
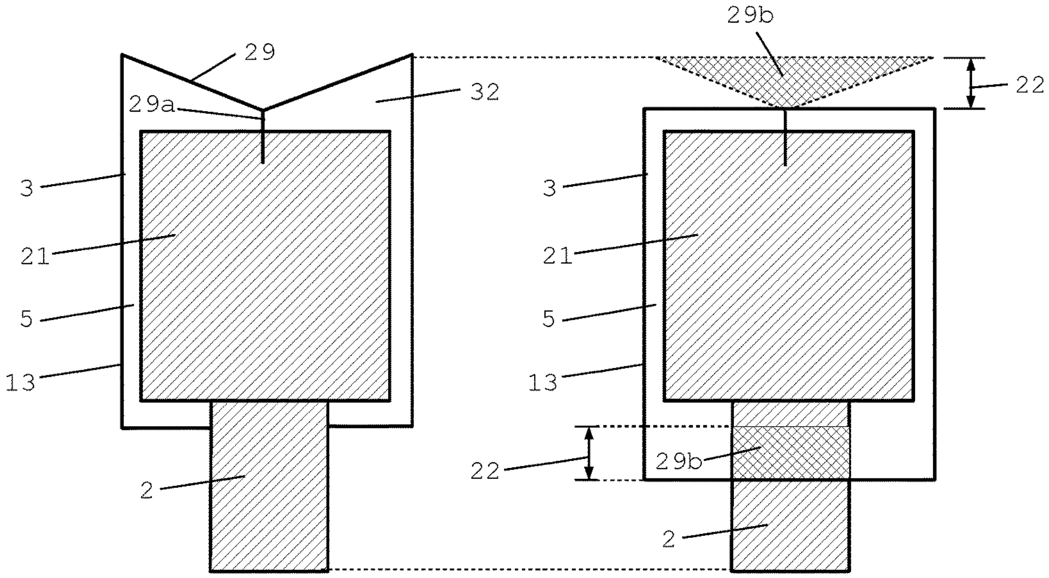
FIG. 5 is a highly schematic view of a braking devices with a snap disk in different positions.

In addition, there is also a separating unit 77 for magnetic separation. The magnetic ring unit 71 is used to measure the orientation or the angle of rotation s of the magnetorheological braking device 1's is used. The magnetic field sensor 72 is arranged inside the first brake component 2, which is non-magnetic in this area. Small relative axial displacements, such as those caused by actuating a snap-action disk, for example, can be used to detect the actuation of the control button 101, as shown in FIG. 4*b*. The angle of rotation and the orientation of the magnetic field lines drawn in by arrows can be detected by the magnetic field sensor 72.

An axial displacement changes the received signal 68 of the sensor device 70 in accordance with the illustration in FIG. 4*b*. FIG. 4*b* shows the course of the amplitude 69 of the signal 68 detected by the magnetic field sensor 72 as a function of the axial displacement of the brake components 2, 3 relative to one another. The amplitude 69 of the detected signal 68 changes as a result of an axial displacement of the magnetic field sensor 72 in relation to the magnetic ring unit 71. An axial displacement or pressing down of an operating button 101 can be detected in this way.

The angle of rotation can also be detected with the same sensor 72, the direction of the magnetic field 8 (arrows shown) being determined to detect the angle of rotation. The intensity determines the axial position. A change in the signal 68 can therefore be used to infer that a button or the snap disk 29 has been actuated. This is advantageous since a single (multidimensional) Hall sensor can be used to determine the angular position and to determine an axial position.

Figure 6:
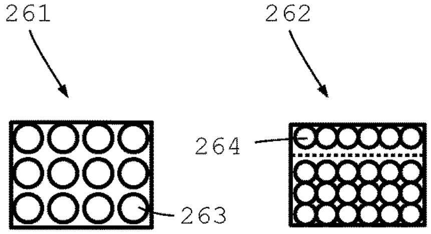
FIG. 6 two differently designed electrical coils.

FIG. 6 shows, purely schematically, two differently designed electrical coils 261, 262, in which case the number of windings can differ. The size/type of diameter and shape and material of the wires 263, 264 can also be different. The size and external shape of the electrical coils 261, 262 can be the same (shown with a solid line) or different, so the second electrical coil 262 can also have a smaller cross section, for example, as shown with a dashed line. As a result, different properties can be set on the magnetic circuits. One magnetic circuit can be designed for a faster reaction speed and/or a higher braking torque, while the other can be designed better in the braking capacity and/or more energy efficient. A wide variety of property combinations can be achieved. The material on the brake gap sections can also be different.

Figure 7A:
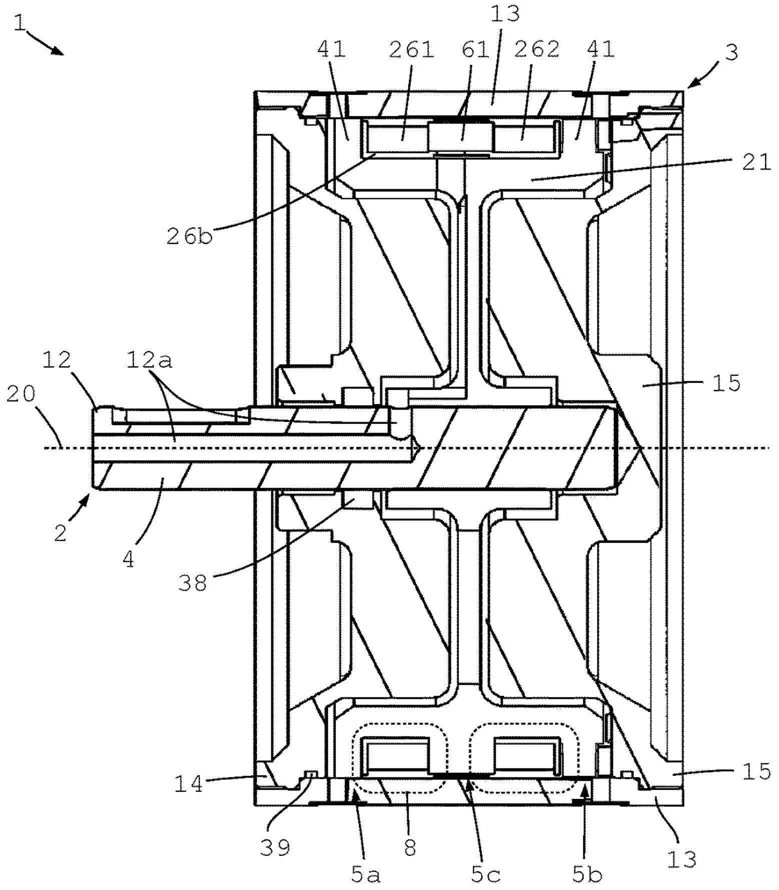
FIGS. 7*a*-7*b* another haptic braking device in section and in perspective.

FIG. 7*a* shows a schematic cross section of a further brake device 1, the first brake component 2 being accommodated on a holder 4 designed as an axle 12. In this embodiment, too, three brake gap sections 5*a*, 5*b*, 5*c* are provided, with a disk contour 41 being formed on the first and second brake gap section 5*a*, 5*b*.

A reservoir 32 for magnetorheological particles can be present in the interior in order to ensure an adequate supply of the brake gap sections with magnetorheological particles. In particular, carbonyl iron particles are attracted from the environment and concentrated in the magnetic field transition region.

In FIG. 7*a*, a cover 14 is attached to the front (left) end and a cover 15 is attached to the rear end.

The disk body 41 is designed here in one piece with the core 21, but can also be designed as a disk assembly 44 with a plurality of disk plates 46.

The casing part 13 and thus the brake circuit here has an outer diameter of between 80 mm and 130 mm. In the example here it is 125 mm. The correspondingly large diameter makes it particularly easy to achieve high moments.

A cable bushing 12*a* is formed on the hollow axle 12, through which the cables for supplying the two electric coils 261 and 261 are passed. The (separate) core 21 is accommodated on the inner part. On the core 21, the two electric coils 261 and 262 are wound on coil holders 26*b*. Between the two electrical coils 261 and 262, the ring contour 61 for the third brake gap section 5*c* is taken or formed. In simple configurations, the ring contour 61 is applied to the core 21 as a separate part and provides a thin gap between the outside of the ring contour 61 and the inner circumference of the casing part 13 are available, as shown above in FIG. 7*a*. The ring contour 61 can also be formed in one piece with the core, cf. 7*a* below. The third brake gap section 5*c* is used to close the two magnetic fields of the two electrical coils 261 and 262.

The magnetic field of the first electrical coil 261 runs essentially radially through the first brake gap section 5*a* and the third brake gap section 5*c* and axially through the core 21 and the casing part 13. The magnetic field of the second electrical coil 262 runs essentially radially through the second brake gap section 5*b* and the third brake gap section 5*c* and axially through the core 21 and the casing part 13. The two electrical coils 261, 262 are wound and energized in such a way that the magnetic fields of the two electrical coils 261, 262 in the region of the third brake gap section 5*c* run in the same direction, as also shown schematically in FIG. 3*b*.

Overall, a braking device 1 that can be produced very cost-effectively is made available, with at least one bearing being able to be saved if necessary by "bearing" via the disk contour 41, which also reduces the overall height. A very low basic friction is achieved. The fact that fewer parts are used, the manufacture becomes simpler and more cost-effective A smaller number of parts also improves the tolerance requirements, since tolerance chains are avoided.

A braking torque can be set separately with the two electrical coils 261, 262 in each case.

Figure 7B:
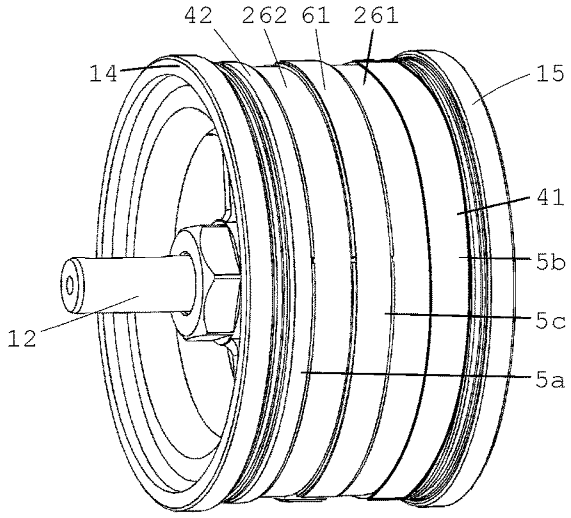

FIG. 7*b* shows the braking device 1 of FIG. 7*a* in a perspective view.

Figure 8:
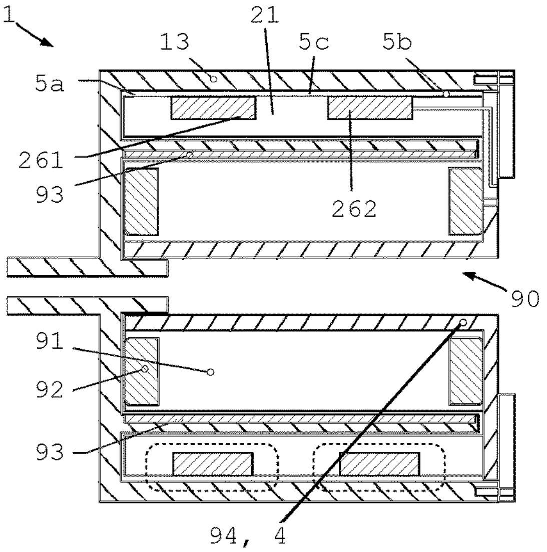
FIG. 8 is a schematic cross section of another braking device 1.

FIG. 8 shows a schematic cross section of a further braking device 1 which is equipped here with a drive device 307 designed as an electric drive motor 90. The drive motor 90 can rotate the steering unit 301 actively. The drive motor 90 is integrated here in the braking device 1 and e.g., designed as a BLDC motor ("brushless direct current motor"). Here, the drive motor 90 comprises a core 91 and a winding 92 as well as one or more permanent magnets 93 and a (stationary) carrier element 94. However, designs without permanent magnets (e.g. electrically excited electric motor) are also possible.

The carrier element 94 is fixed here and is firmly connected to the holder 4, so that a moment can be generated both during braking and during active driving (action=reaction). The aforementioned components of the drive motor 90 are here arranged radially and also axially within the outer circumference defined by the brake gap sections 5*a*, 5*b*, 5*c*. The MRF brake is built, so to speak, radially around the drive motor 90, as a result of which installation space can be saved considerably. This is particularly advantageous in the case of steering devices 1 for autonomously driving vehicles. Because there it is often desired that the steering wheel can be moved forward by a person in the driver's seat by 300 mm, so that the person e.g., can work with a notebook while the vehicle drives autonomously. There is often not enough installation space available in a cockpit for such a large travel distance. With the invention shown here, this space is created.

Figure 9:
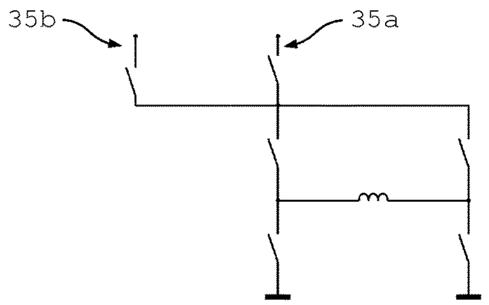
FIG. 9 shows a highly schematic circuit for controlling the electrical coil.

FIG. 9 shows a schematic of a circuit for rapid activation of the electric coil 26. The electric coil 26 (magnetic coil) is activated here by an H circuit. This is only indicated in FIG. 9 by switches. A voltage source 35*a* used in normal operation or in continuous operation with a lower voltage of e.g., 12V provides the voltage for normal operation. For the voltage peaks, a voltage source 35*b* with a higher voltage of, for example, 18V or 24V is connected via a switch. Then, the lower voltage power source 35*a* is temporarily disconnected. After this when the maximum current is reached, the higher voltage source 35*b* is again disconnected from the circuit and the electrical coil 26 and the lower voltage source 35*a* is reconnected. The switches can be any electrical components that are particularly capable of coupling and decoupling in the millisecond range.

As a result, the current in the electrical coil 26 reaches the desired value more quickly. In a specific case, the desired current is reached within 10 ms instead of 40 ms. The change between the voltages can take place via an electrical circuit.

Figure 10:
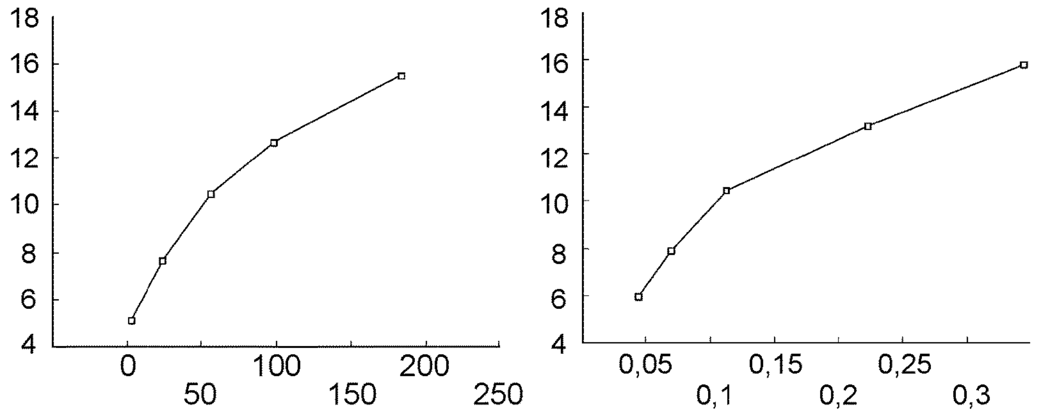
FIG. 10 a sketch with braking torque curves to illustrate the functioning of the braking device.

FIG. 10 shows a schematic representation of two generated braking torque curves, the generated braking torque (normalized and therefore dimensionless here) being plotted against the electrically introduced power (normalized and therefore dimensionless here). The curve for a BLDC motor ("brushless direct current motor") is shown on the left and the curve for a magnetorheological braking device is shown on the right. It can be seen that the electric motor requires considerably more current than the magnetorheological braking device for the same braking torque a braking torque of "14" requires the electric motor more than "130" normalized power, while the magnetorheological braking device (clearly) requires a power of less than "0.3". The power consumption ratio is greater than 100:1 and is around 500:1 here.

Magnetorheological clutch devices and brakes have the advantage, among other things, that they only require little power for clutching or for damping movements, are quiet, generate little heat and react very quickly (~ms), etc. The low power requirement is particularly advantageous for battery-operated components such as e.g. electric vehicles, in which the power consumption of all components is automatically reflected in the range of the vehicles. But also for vehicles with combustion engines or electrical devices in general power consumption is an issue.

Figure 11:
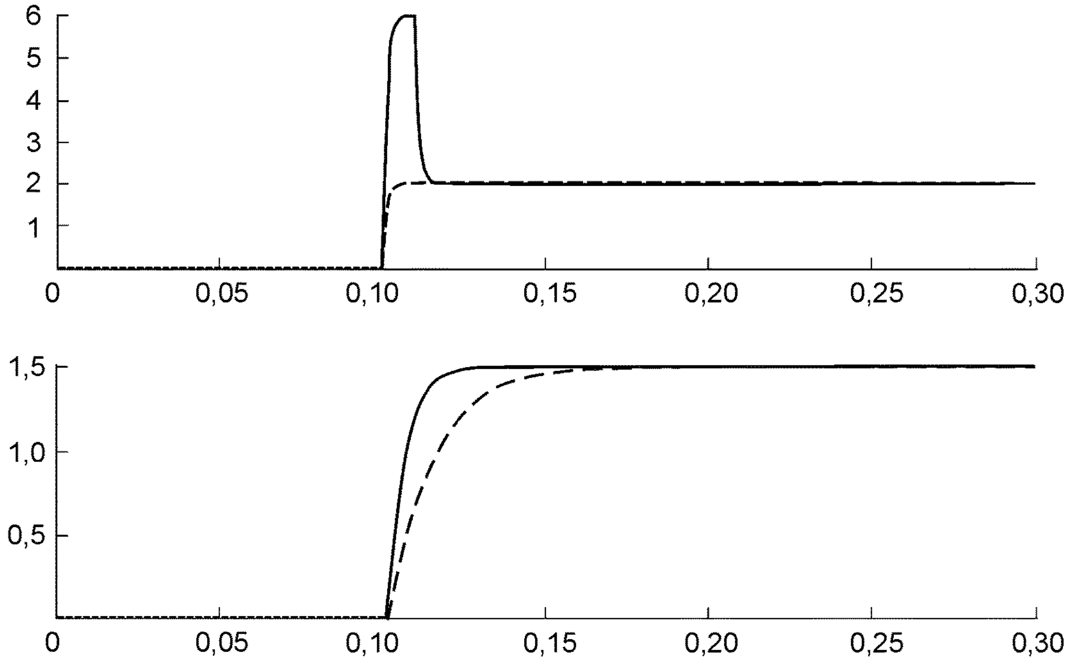
FIG. 11 shows another sketch with braking torque curves.

The system requires much less electricity than activation via an electric motor alone. In general, it is currently the case for electrically powered motor vehicles that you can travel around 6 km with 1 kWh, while one kWh of battery capacity costs around 230 euros, with one kWh of battery capacity causing around 6 kg more weight. Even if this data will change in the future, energy demand will continue to play an important role. FIG. 11 shows the resulting braking torque curves of a magnetorheological braking device 1 for two different current strength curves over time. The dashed curve in the upper half of the figure represents the conventional course, in which the current intensity is increased directly to the desired current intensity.

Here, at the point in time 0.1 seconds, the current intensity is increased from 0 amperes to 2 amperes. The resulting course of the braking torque or the coupling intensity is shown in broken lines in the lower half of FIG. 13. The transmittable braking torque increases in the dashed curve from the start time at 0.1 seconds within about 25 milliseconds (time 0.125 seconds) to a read value of about 1.25 (normalized to e.g., an average value or a standard unit) and reaches after about 75 milliseconds (point in time 0.175 seconds) asymptotically (almost) the set limit value of about 1.5.

If, on the other hand, at the beginning of the clutch or the start of the braking process, the current intensity is increased threefold to, for example, 6 amperes are increased here, as shown by the solid lines, the braking torque increases considerably more and reaches the final value of 1.5 after around 10 milliseconds. Here, the "current boost" with an increased current is only activated for about 10 ms. After that, as shown by the upper solid curve, the current is reduced to 2 amperes. A significantly faster setting can be achieved by briefly increasing the current ("current boost") of the clutch or brake torque. That is This is very advantageous in several respects, since it is possible to stop quickly and experience a more direct haptic feeling. A major advantage of the construction is that no cables, sensors or electronics are required on the outside. A high IP class is therefore possible in all configurations. In principle, everything is behind a mounting panel.

The electrical coils are preferably completely separated from the space containing the magnetorheological medium, in particular by means of a casting compound.

In preferred configurations, an axial displacement is possible, in which case, in particular, a liquid volume is displaced in the interior. Sufficient space is preferably provided between a cover and a disk contour so that the medium (or liquid) (carbonyl) therebetween is not compressed. (Otherwise, this could lead to high axial adjustment forces.) This provides an additional MRF reservoir from which particles can flow into the area of the disk contour or the rolling elements. Namely, magnetic particles always flow in the direction of the stronger field since magnetic particles are attracted by the magnetic field gradient.

The seal preferably runs on the axle. There is rotary movement (more than 100,000 revolutions are possible) and there can be linear movement for the probe. To ensure that the seal does not run in and form a running groove and that the friction is low and the leakage (drag oil) does not become too high over the service life, a corresponding material pairing with a hard running surface is preferred.

The first brake gap section 5*a* is preferably equipped with a disk contour. The second braking gap section 5*b* is equipped in particular with rolling bodies and in particular rollers. Rolling elements and especially rollers with a round inner ring enable a high static moment. A disc contour enables good magnetic field transmission and a high torque at high speeds.

The combined solution, also called hybrid solution, combines both advantages. In contrast, an axial transition of the magnetic field in the prior art had a smaller transition area and thus resulted in lower braking torques. In addition, an axial magnetic field transition has a smaller distance (radius) and therefore generates less moment. A brake gap section 5*a*, which is also radial, with a disk contour has a larger diameter and thus generates a larger moment with the same force. In addition, the area is larger because the larger circumference spans a larger area. If the width of the contour disc is greater than ⅙ of the diameter, the braking torque that can be transmitted at the (circumferential) radial braking gap section is already greater than the maximum braking torque that can be transmitted on the axial surface! Finally, due to the lower gap height at the disk contour, the magnetic losses are smaller. All of this results in a higher braking torque, even at higher speeds.

Volume compensation for the push function can be provided by a membrane at the end of the jacket part. Behind the membrane is a click element like a snap-action disk ("Snap Dome"). This gives a tactile pressure point. You can also hear the click when the pressure point is reached and the snap-action disk presses the entire button or the shell part back into the starting position (similar to a mouse button on a computer mouse).

The membrane then seals the MRF space. The volume behind the membrane acts as a volume balance when pressed. In the normal position, the snap-action disc has a bulge. If the button is moved in the axial direction, the stator of the braking device presses against the membrane and the snap-action disc. This will flatten it out.

Normal glass can be used as the transparent material or PMMA (acrylic glass). The advantage of PMMA is that you can use milky glass, which breaks the light inside and can thus illuminate the entire surface evenly. One or more LEDs can be used for lighting, also with different colors.

In all configurations, the outer brake component can also be non-rotatable and the inner brake component can be the rotatable component. In this case, the electric coil must be electrically contacted via lines through the outer braking component or e.g., via sliding contacts.

With the invention presented here, the required working range of the steering device 100 can be divided into several sub-areas. A first portion is provided by the drive device 307 and offers an active drive torque e.g., between 0 and 8 Newton meters. A second sub-area is provided by the first brake gap section 5*a* and offers a braking torque e.g., between 0 and 5 Newton meters. A third sub-area is provided by the second brake gap section 5*b* and offers a braking torque e.g., between 0 and 25 Newton meters. Due to the disk contour 41 in the first brake gap section 5*a*, a particularly high control quality can be achieved for the first partial area. Since this sub-area is particularly important for steering precision, the high control quality here has a particularly beneficial effect on steering behavior.

The steering device 100 presented here also has the advantage that the necessary active torque (driving torque) can be achieved by a compact and agile electric motor with high control quality and lower power consumption (better efficiency in the partial load range). The required low passive torque (braking torque, for example, up to 8 Newton meters) is achieved here by the first brake gap section 5*a* with particularly low basic friction and high control quality with low power consumption at the same time. The required higher passive Torque (braking torque, for example, up to 25 Newton meters) is achieved here with the second brake gap section 5*b*, which also has particularly low basic friction and normal control quality with low power consumption at the same time. This results in triple redundancy.

At the same time, the steering movement can be influenced noiselessly and smoothly. In addition, in the event of a malfunction of the drive device 307, the braking device 1 can slow down its active torque. In addition, a motor curve (fluctuating torque over the angle of rotation) can be smoothed out or corrected by the braking device 1. In addition, the braking device 1 requires significantly less electricity than an electric motor to generate a comparable braking torque.

The steering device presented can also be used in combination with the on-board computer, display instrument or a head-up display as a game console or as a driving or flight simulator. When the vehicle is parked (e.g., in the case of electric vehicles, when charging) or the car has a self-driving mode, the user can use the steering device as an input device of a computer game. When changing from gaming mode to real ferry operation, haptic feedback is preferably provided.

Certain parameters of the steering device can also be set or configured or stored in a customer-specific manner, within system limits, via the on-board computer or other input devices (individualization). The individual settings can be called up using key recognition, smartphone or smart device communication, driver recognition (image recognition; face recognition), gesture control, voice control, data analysis or manual input.

LIST OF REFERENCES

1 magnetorheological braking device
2, 3 brake component
4 holders
5 gap
5*a* braking gap section for 41
5*b* braking gap section for 11
5*c* braking gap section for 61
5*d* braking gap section
6 medium
8 magnetic field, field
11 rolling elements
11*b* gap height of 5*b*
11*c* radial clearance at 5*b*
11*d* diameter of 11
11*e* axial width of 11
11*f* bracket
12 axis
12*a* cable bushing
13 casing part
14 cover, lid
15 cover, lid
16 pin
18 bulbs
19 magnetic particles
20 axis of rotation, axial direction
21 core
22 hub
23 knob
26 coil
26*b* bobbin holder
26*e* axial width
28 potting compound
29 snap disk
29*a* guide
29*b* volume
31 membranes
32 reservoirs
35*a* power supply 12V
35*b* power supply 18V
38 seal
39 O ring
40 star contour
40*c* gap height
41 disc contour
41*a* integral annular flange
41*b* gap height of 5*a*
41*e* axial width of 5*a*
42 ring body, disc body
42*a* recording
43 user interface

44 disc pack
45 cables
46 disk sheet metal
47 bulged outer contour
48 filling screw
49 coating
50 console
51 nut
61 ring contour
68 signals
69 amplitude
70 sensor
71 magnetic ring assembly
72 magnetic field sensor
75 shielding device
76 shielding bodies
77 separation unit
78 decoupling device
79 sensor board
79*a* contact pin
80 magnetic field concentrator
90 drive motor
91 core
92 winding
93 permanent magnet
94 carrier element
100 steering device
101 control head
102 operating roller
110 closed chamber
200 device component
261 electric coil
262 electric coil
263 wire
264 wire
301 steering unit
302 steering controller
303 actuator device
304 driver assistance system
305 remanence device
306 security device
307 drive device
311 steering shaft

The invention claimed is:

1. A steering device for steering a vehicle comprising:

a movable steering unit, a movement of the steering unit being configured to be braked by at least one magnetorheological braking device;

the at least one magnetorheological braking device having a stationary holder and at least two brake components;

at least one of the at least two brake components being rotatable by the steering unit and at least one other of the two brake components being non-rotatably connected to the stationary holder;

the at least two brake components being continuously rotatable relative to one another about an axis of rotation;

a first brake component of the at least two brake components extending along the axis of rotation and having a core made of a magnetically conductive material;

a second brake component of the at least two brake components having a hollow casing part extending around the first brake component;

at least one circumferential gap filled at least partially with a magnetorheological medium being formed between the first and second brake component;

the at least one circumferential gap having a plurality of axially spaced brake gap sections, being at least three brake gap sections or at least two differently shaped braking gap sections;

a disk contour being formed between the hollow casing part and the core in a first braking gap section of the at least three brake gap sections; and a differently shaped disk contour with rolling bodies being formed between the hollow casing part and the core in a second braking gap section of the at least three brake gap sections.

2. The steering device according to claim 1, wherein:

at least one third brake gap section of the at least three brake gap sections is arranged axially between the first brake gap section and the second brake gap section; and the first brake gap section has a first electric coil and the second brake gap section has a separately controllable second electrical coil.

3. The steering device according to claim 2, wherein the first electrical coil and the second electrical coil are each received between the hollow casing part and the core and are each wound around the axis of rotation.

4. The steering device according to claim 2, wherein the first electric coil and the second electric coil are designed differently and wherein the first electric coil and the second electric coil are in at least one Distinguish parameters from a group of parameters, which group includes as parameters a wire diameter and wire cross-section, a number of windings, a winding window, a type of winding, a coil width, a coil diameter and a material.

5. The steering device according to claim 1, further comprising at least one drive device for generating a drive torque for the active movement of the steering unit, the drive device having at least one electric motor arranged at least substantially radially within an outer circumference of the gap.

6. The steering device according to claim 1, further comprising an actuator configured for converting a steering movement carried out with the steering unit into a vehicle movement, wherein the steering unit and the actuator are configured to be operatively connected electrically and/or electromagnetically.

7. The steering device according to claim 1, wherein the at least one magnetorheological braking device has a braking torque when the magnetorheological medium is actively influenced and a basic torque when the magnetorheological medium is influenced in an inactive manner, and the basic torque is at least 50 times lower than a maximum braking torque that can be provided.

8. The steering device according to claim 1, wherein the first brake gap section is assigned a first electrical coil and the second brake gap section is assigned a separately controllable second electrical coil.

9. The steering device according to claim 1, comprising at least one steering control unit for controlling the at least one magnetorheological braking device depending on a position of the steering unit and/or a movement parameter of the steering unit and/or an operating state of the vehicle, and wherein the at least two brake gap sections can be controlled separately by the steering control unit.

10. The steering device according to claim 9, wherein the steering control unit is configured to select at least one brake gap section of the at least two brake gap sections depending on the level of a braking torque to be set and/or at least to combine two of the braking gap sections and thus to brake the movement of the steering unit.

11. The steering device according to claim 10, wherein the steering control unit is configured to take into account a user property for setting the braking torque.

12. The steering device according to claim 10, wherein the steering control unit is configured to adjust the braking torque based on the position at which the steering unit is held.

13. The steering device according to claim 9, wherein the steering control unit is configured to generate a braking torque for braking the movement of the steering unit at least predominantly with the first braking gap section if a vehicle speed is above a limit value.

14. The steering device according to claim 9, wherein the steering control unit is configured to block mobility of the steering unit and the only with the second brake gap section and/or or with a combination of at least two braking gap sections is configured to provide a braking torque required to block mobility of the steering unit.

15. The steering device according to claim 9, wherein the steering control unit is configured to have an end stop for the mobility of the steering unit at least predominantly provided by the second brake gap section and/or with a combination of at least two brake gap sections.

16. The steering device according to claim 9, wherein the steering control unit is configured:
- to brake or block mobility of the steering unit as a function of a driver assistance system to prevent critical steering movements; and
- to select at least one braking gap section of the at least two braking gap sections to control the braking or blocking.

17. The steering device according to claim 9, wherein the steering control unit is configured to generate a haptically perceptible feedback on the steering unit with a defined sequence of braking torques.

18. The steering device according to claim 9, wherein the steering control unit is configured to determine user behavior using at least one algorithm of machine learning and to setting the braking torque based on the determined user behavior.

19. The steering device according to claim 1, wherein the magnetorheological medium has at least one metallic powder and wherein the metallic powder has a volume fraction of at least 50%.

20. The steering device according to claim 19, wherein the metallic powder is provided with a coating.

21. The steering device according to claim 1, further comprising at least one retentivity device and/or at least one permanent magnet unit which is configured to maintain a braking torque with at least one of the at least two brake gap sections without the supply of electric current.

22. The steering device according to claim 1, further comprising at least one safety device configured to remove the magnetorheological medium at least partially from the gap.

23. The steering device according to claim 1, wherein the gap has a maximum diameter of less than 100 mm.

24. The steering device according to claim 1, further comprising at least one drive device configured for generating a drive torque for actively moving the steering unit.

25. The steering device according to claim 24, wherein a maximum braking torque of the second brake gap section is at least twice a maximum drive torque of the drive device.

26. The steering device according to claim 24, wherein the at least one magnetorheological braking device, in the event of a failure of the drive device, can provide a braking torque which is at least as high as its drive torque.

27. The steering device according to claim 24, wherein the steering control unit is configured to at least approximately compensate for fluctuations in the drive torque of the drive device by adjusting the braking torque.

28. The steering device according to claim 1, wherein the disk contour has at least one star contour, and, in the area of the star contour, a variable gap height over the circumference of the braking gap section, and wherein magnetic field concentrators are arranged on the star contour and protrude radially into the braking gap section.

29. The steering device according to claim 1, wherein the third braking gap portion is formed through at least one ring contour, which is arranged between the hollow casing part and the core.

30. The steering device according to claim 29, wherein the first electrical coil is arranged axially between the first brake gap section and the ring contour and wherein the second electrical coil is arranged axially between the ring contour and the second brake gap section.

31. The steering device according to claim 29, wherein the ring contour is designed as a separate part and wherein the magnetic fields of the first electric coil and the second electric coil run through the ring contour.

32. The steering device according to claim 1, further comprising:
- a sensor configured for detecting a relative angle of rotation between the core and the hollow casing part; and/or
- a sensor for detecting a relative axial position of the hollow casing part to the brake component.

33. The steering device according to claim 1, wherein the magnetorheological medium contains individual magnetically polarizable particles; and a magnetic field strength between the individual magnetically polarizable particles is greater than 300 kA/m.

34. The steering device according to claim 1, wherein a magnetic field strength that can be generated in the gap is greater than 500 kA/m.

35. The steering device according to claim 1, wherein the at least three brake gap sections is at least four brake gap sections.

36. The steering device according to claim 1, wherein the at least one magnetorheological braking device is at least two magnetorheological braking devices.

37. A method for operating a steering device, the method comprising:
- providing a steering device for steering a vehicle having:
  - a movable steering unit, a movement of the steering unit being configured to be braked by at least one magnetorheological braking device,
  - the at least one magnetorheological braking device having a stationary holder and at least two brake components,
  - at least one of the at least two brake components being rotatable by the steering unit and at least one other of the two brake components being non-rotatably connected to the stationary holder,
  - the at least two brake components being continuously rotatable relative to one another about an axis of rotation,
  - a first brake component of the at least two brake components extending along the axis of rotation and having a core made of a magnetically conductive material,
  - a second brake component of the at least two brake components having a hollow casing part extending around the first brake component, at least one circumferential gap filled at least partially with a magnetorheological medium being formed between the first and second brake component, the at least one circumferential gap having a plurality of axially spaced brake gap sections, being at least three brake gap sections or at least two differently shaped braking gap sections, a disk contour being formed between the hollow casing part and the core in a first braking gap section of the at least three brake gap sections, and a differently shaped disk contour with rolling bodies being formed between the hollow casing part and the core in a second braking gap section of the at least three brake gap sections;

generating, with a first electric coil, a controlled magnetic field in the first braking gap section and a third braking gap section of the at least three brake gap sections; and generating, independently, with a second electric coil, a controlled magnetic field in the second braking gap section and the third brake gap section in order to generate braking effects of different strength depending on a speed.

38. The method according to claim 37, wherein different fast braking effects are generated with the first electric coil and the second electric coil.

39. The method according to claim 37, wherein braking effects of different energy efficiency are generated with the first electric coil and the second electric coil.

* * * * *